(12) United States Patent
Shimada et al.

(10) Patent No.: US 7,433,958 B2
(45) Date of Patent: *Oct. 7, 2008

(54) PACKET RELAY PROCESSING APPARATUS

(75) Inventors: Kuniaki Shimada, Kawasaki (JP); Ken Yokoyama, Kawasaki (JP); Toshihiko Kurita, Kawasaki (JP); Tsuneo Katsuyama, Kawasaki (JP); Takeshi Kawasaki, Kawasaki (JP); Koichi Takaba, Kawasaki (JP); Hiroyasu Kageyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 9 days.

This patent is subject to a terminal disclaimer.

(21) Appl. No.: 11/279,338

(22) Filed: Apr. 11, 2006

(65) Prior Publication Data

US 2006/0168328 A1 Jul. 27, 2006

Related U.S. Application Data

(63) Continuation of application No. 10/056,091, filed on Jan. 28, 2002, now Pat. No. 7,107,348.

(30) Foreign Application Priority Data

Mar. 27, 2001 (JP) ............................. 2001-090122
Oct. 4, 2001 (JP) ............................. 2001-308387

(51) Int. Cl.
*G06F 15/16* (2006.01)

(52) U.S. Cl. ........................ 709/229; 709/227; 709/228

(58) Field of Classification Search ................. 709/227, 709/228, 229, 238, 239; 370/218, 392
See application file for complete search history.

(56) References Cited

U.S. PATENT DOCUMENTS

| | | | | |
|---|---|---|---|---|
| 6,084,879 | A * | 7/2000 | Berl et al. | 370/389 |
| 6,125,388 | A * | 9/2000 | Reisman | 709/218 |
| 6,351,775 | B1 | 2/2002 | Yu | |
| 6,363,411 | B1 * | 3/2002 | Dugan et al. | 709/202 |
| 6,546,425 | B1 * | 4/2003 | Hanson et al. | 709/227 |
| 6,714,987 | B1 * | 3/2004 | Amin et al. | 709/249 |
| 6,765,909 | B1 * | 7/2004 | Sen et al. | 370/392 |

(Continued)

FOREIGN PATENT DOCUMENTS

JP 11-004261 1/1999

(Continued)

OTHER PUBLICATIONS

Communication from Japanese Patent Office for Japanese Application No. 2001-308387 mailed Mar. 28, 2006.

(Continued)

*Primary Examiner*—Ario Etienne
*Assistant Examiner*—Sargon N Nano
(74) *Attorney, Agent, or Firm*—Staas & Halsey LLP

(57) ABSTRACT

A packet processing unit and a session managing unit, which are conventionally arranged in a server, are arranged in a network connecting device, and the network connecting device performs a packet relay process based on session management. As a result, the load on a server is reduced, and a process by the server is performed faster.

22 Claims, 39 Drawing Sheets

U.S. PATENT DOCUMENTS

| | | |
|---|---|---|
| 6,907,042 B1 | 6/2005 | Oguchi |
| 6,910,074 B1 * | 6/2005 | Amin et al. ................. 709/227 |
| 6,987,768 B1 | 1/2006 | Kojima et al. |
| 2002/0016826 A1 * | 2/2002 | Johansson et al. ........... 709/207 |
| 2003/0055978 A1 * | 3/2003 | Collins ....................... 709/227 |
| 2006/0224753 A1 * | 10/2006 | Hama et al. ................. 709/230 |

FOREIGN PATENT DOCUMENTS

| | | |
|---|---|---|
| JP | 2000-332817 | 11/2000 |
| JP | 2000-349851 | 12/2000 |
| JP | 2001-016254 | 1/2001 |

OTHER PUBLICATIONS

U.S. Appl. No. 10/056,091, filed Jan. 28, 2002, Kuniaki Shimada et al., Fujitsu Limited.

A. Sekiguchi et al., "A Mechanism of Policy Creation on Policy-Based Networking", Mar. 28-31, 2000, pp. 665-666, Proceedings of the 2000 IEICE General Conference, the Institute of Electronics, Information and Communication Engineers.

Office Action mailed Feb. 6, 2007 in corresponding Japanese Patent Application No. 2001-308387.

* cited by examiner

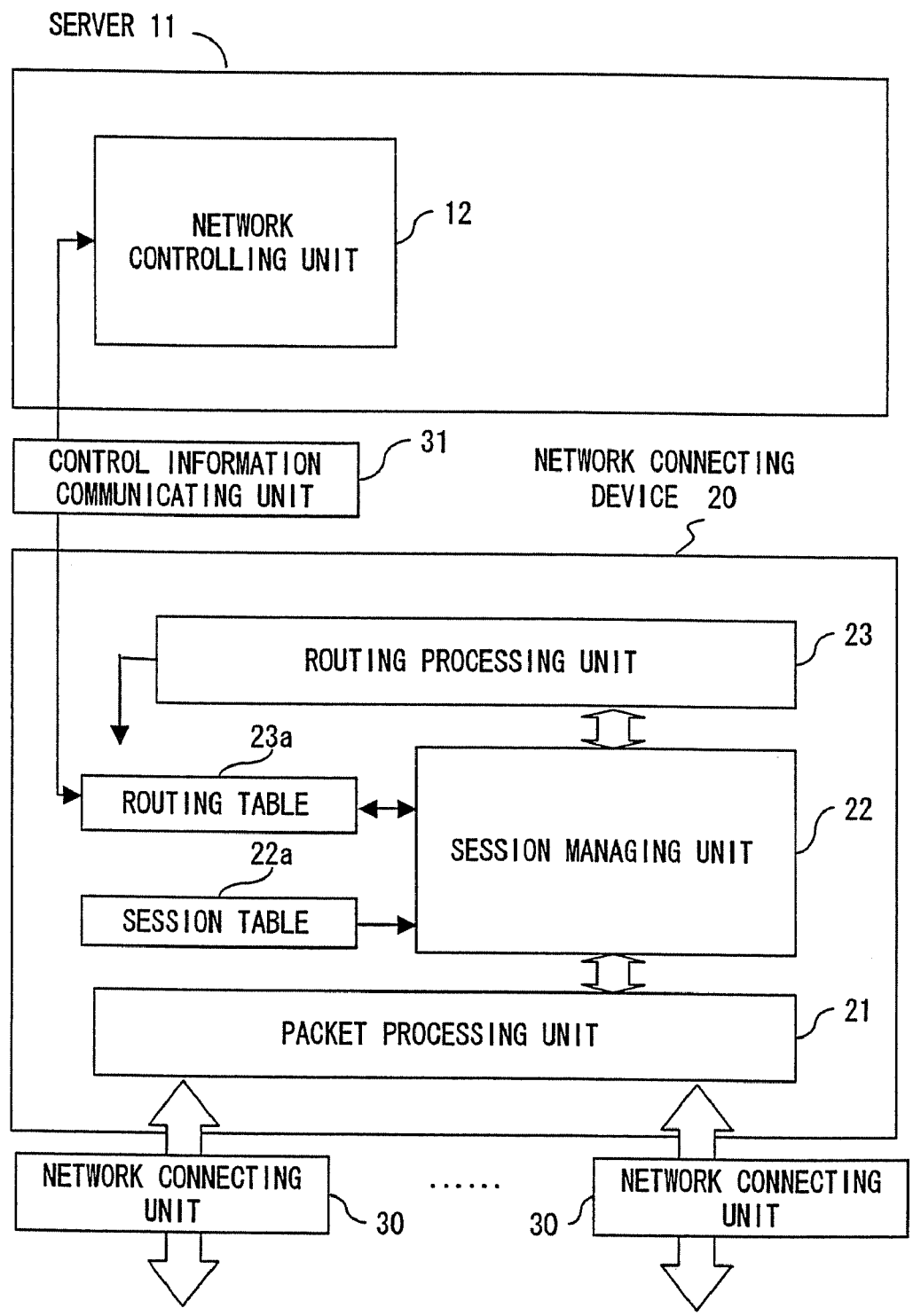
F I G. 3

SESSION TABLE 22a

| SESSION ID | SESSION SEARCH KEY | | | | | SESSION STATE | OUTPUT DESTINATION |
|---|---|---|---|---|---|---|---|
| | SOURCE IP ADDRESS | SOURCE PORT NUMBER | PROTOCOL | DESTINATION IP ADDRESS | DESTINATION PORT NUMBER | | |
| 0 | 192.168.100.14 | 13200 | TCP | 192.168.10.5 | 8080 | ESTAB | |
| 1 | 192.168.10.5 | 8080 | TCP | 192.168.100.14 | 13200 | ESTAB | |
| 2 | 192.168.100.100 | http | TCP | 10.25.1.230 | 9250 | IN SYN | |
| 3 | 10.25.1.230 | 9250 | TCP | 192.168.100.75 | http | IN SYN | |

FIG. 7

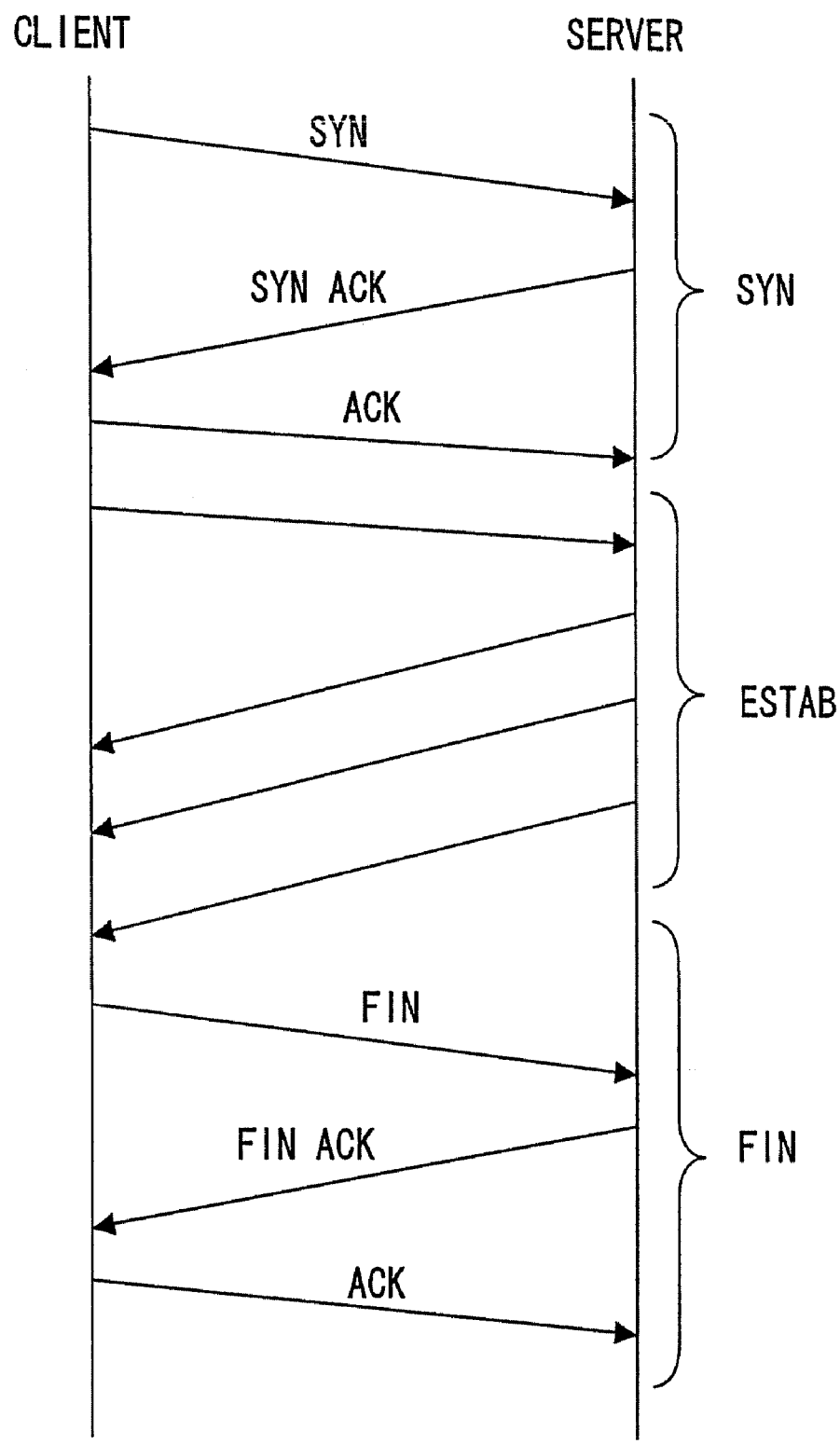
F I G. 9

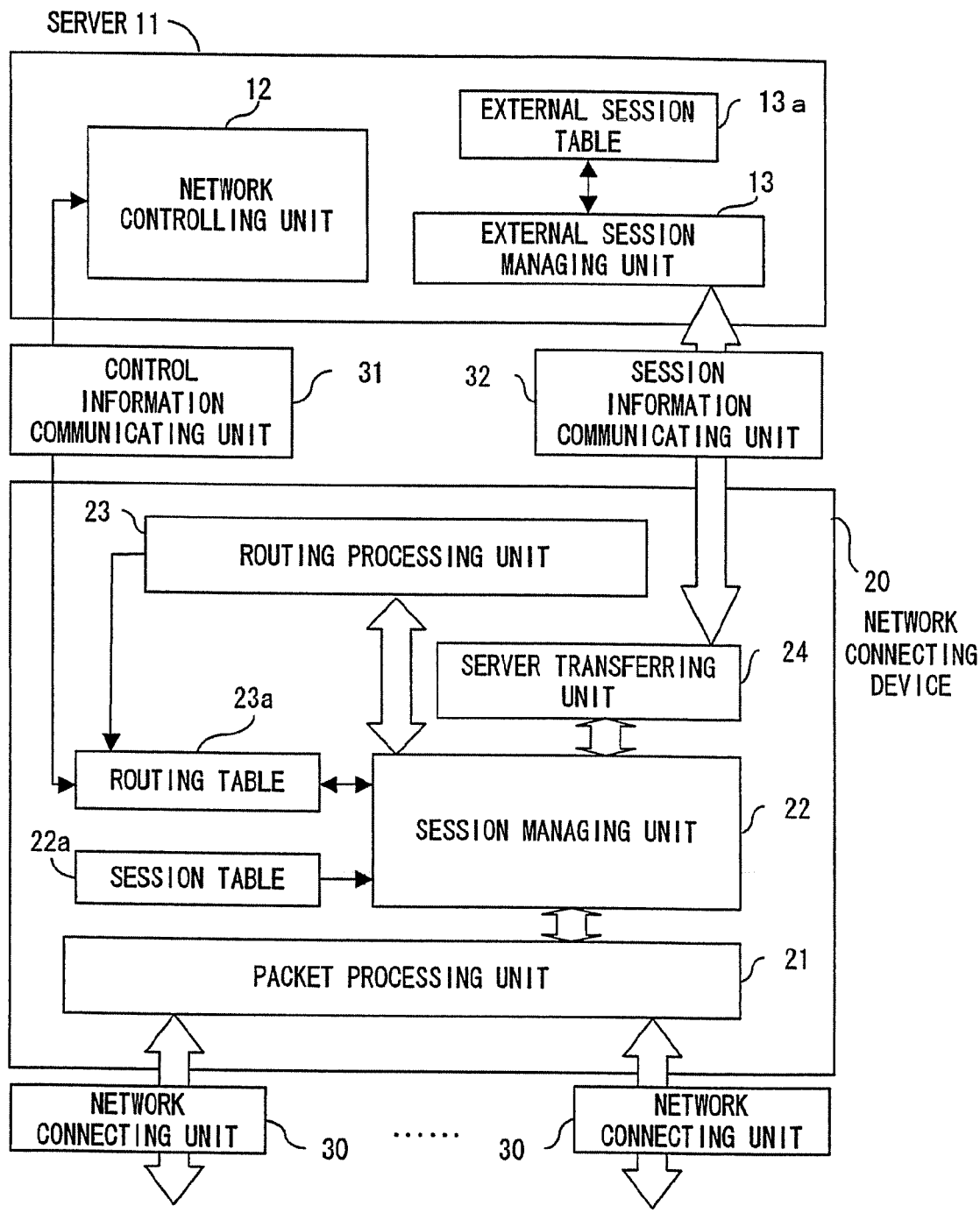
F I G. 11

SESSION TABLE 22a'

| SESSION ID | | 0 | 1 | 2 | 3 |
|---|---|---|---|---|---|
| SESSION SEARCH KEY | SOURCE IP ADDRESS | 192.168.100.14 | 192.168.10.5 | 192.168.100.100 | 10.25.1.230 |
| | SOURCE PORT NUMBER | 13200 | 8080 | http | 9250 |
| | PROTOCOL | TCP | TCP | TCP | TCP |
| | DESTINATION IP ADDRESS | 192.168.10.5 | 192.168.100.14 | 10.25.1.230 | 192.168.100.75 |
| | DESTINATION PORT NUMBER | 8080 | 13200 | 9250 | http |
| | INPUT INTERFACE | 0 | 1 | 0 | 1 |
| SESSION STATE | | ESTAB | ESTAB | IN SYN | IN SYN |
| OUTPUT DESTINATION INTERFACE | | 1 | 0 | 1 | 0 |
| APPLIED SERVICE TYPE | | FILTERING AND PASSING | FILTERING AND PASSING | HEADER REWRITE | HEADER REWRITE |
| SERVICE-SPECIFIC INFORMATION | | — | — | Src:192.168.100.75 | Dst:192.168.100.100 |
| CONSISTENCY DURATION (ms) | | 1000 | 1000 | 3000 | 3000 |
| EVENT FLAG (PACKET) | | OFF | OFF | OFF | OFF |
| EVENT FLAG (HEADER) | | ON | ON | OFF | OFF |

FIG. 14

POLICY TABLE 25

| POLICY ID | | 0 | 1 |
|---|---|---|---|
| POLICY SEARCH KEY | SOURCE IP ADDRESS | Any | Any |
| | SOURCE PORT NUMBER | Any | Any |
| | PROTOCOL | Any | TCP |
| | DESTINATION IP ADDRESS | GW | 192.168.100.75 |
| | DESTINATION PORT NUMBER | Any | http |
| APPLIED SERVICE TYPE | | FILTERING AND DISCARDING | LOAD BALANCING |
| SERVICE-SPECIFIC INFORMATION | | – | DISTRIBUTION DESTINATION 1: 192.168.100.100<br>DISTRIBUTION DESTINATION 2: 192.168.100.110<br>DISTRIBUTION DESTINATION 3: 192.168.100.120<br>DISTRIBUTION DESTINATION 4: 192.168.100.130<br>DISTRIBUTION METHOD: ROUND ROBIN |
| PRIORITY | | 5000 | 1000 |
| GROUP ID | | 6 | 32 |
| EVENT FLAG (PACKET) | | OFF | OFF |
| EVENT FLAG (HEADER) | | ON | OFF |
| CONSISTENCY DURATION (ms) | | 1000 | 3000 |
| NUMBER OF POLICY HITS | | 2 | 2 |

FIG. 15

SESSION TABLE 22a'

| SESSION ID | | 0 | 1 | 2 | 3 | 4 | 5 |
|---|---|---|---|---|---|---|---|
| SESSION SEARCH KEY | SOURCE IP ADDRESS | 192.168.50.5 | 192.168.1.5 | 192.168.30.30 | 192.168.200.1 | 192.168.200.1 | 192.168.200.10 |
| | SOURCE PORT NUMBER | 16321 | 8080 | 11950 | http | 3333 | 8080 |
| | PROTOCOL | TCP | TCP | TCP | TCP | TCP | TCP |
| | DESTINATION IP ADDRESS | 192.168.1.5 | 192.168.50.5 | 192.168.200.1 | 192.168.30.30 | 192.168.200.10 | 192.168.200.1 |
| | DESTINATION PORT NUMBER | 8080 | 16321 | http | 11950 | 8080 | 3333 |
| | INPUT INTERFACE | 0 | 1 | 0 | Server | Server | 1 |
| SESSION STATE | | IN SYN | IN SYN | ESTAB | ESTAB | IN SYN | IN SYN |
| OUTPUT DESTINATION INTERFACE | | 1 | 0 | – | 0 | 1 | – |
| APPLIED SERVICE TYPE | | SERVER TRANSFER: ON URL FILTERING | SERVER TRANSFER: ON URL FILTERING | SERVER TRANSFER: ON URL LOAD BALANCING | SERVER TRANSFER: ON URL LOAD BALANCING | SERVER TRANSFER: ON URL LOAD BALANCING | SERVER TRANSFER: ON URL LOAD BALANCING |
| SERVICE-SPECIFIC INFORMATION | SOURCE IP ADDRESS FOR TRANSLATION | – | – | – | – | – | – |
| | SOURCE PORT NUMBER FOR TRANSLATION | – | – | – | – | – | – |
| | DESTINATION IP ADDRESS FOR TRANSLATION | – | – | – | – | – | – |
| | DESTINATION PORT NUMBER FOR TRANSLATION | – | – | – | – | – | – |
| | SEQUENCE NUMBER DIFFERENCE | – | – | – | – | – | – |
| | ACK NUMBER DIFFERENCE | – | – | – | – | – | – |
| CONSISTENCY DURATION (ms) | | 1000 | 1000 | 3000 | 3000 | 3000 | 3000 |
| EVENT FLAG (PACKET) | | OFF | OFF | OFF | OFF | OFF | OFF |
| EVENT FLAG (HEADER) | | OFF | OFF | OFF | OFF | OFF | OFF |

URL LOAD BALANCING

F I G. 2 2

SESSION TABLE 22a'

| SESSION ID | | 6 | 7 |
|---|---|---|---|
| SESSION SEARCH KEY | SOURCE IP ADDRESS | 192.168.2.100 | 192.168.25.250 |
| | SOURCE PORT NUMBER | 3001 | 21 |
| | PROTOCOL | TCP | TCP |
| | DESTINATION IP ADDRESS | 192.168.25.250 | 192.168.2.100 |
| | DESTINATION PORT NUMBER | 21 | 3001 |
| | INPUT INTERFACE | 0 | 1 |
| SESSION STATE | | IN SYN | IN SYN |
| OUTPUT DESTINATION INTERFACE | | 1 | 0 |
| APPLIED SERVICE TYPE | | SERVER TRANSFER: ON FTP FILTERING | SERVER TRANSFER: ON FTP FILTERING |
| SERVICE-SPECIFIC INFORMATION | SOURCE IP ADDRESS FOR TRANSLATION | - | - |
| | SOURCE PORT NUMBER FOR TRANSLATION | - | - |
| | DESTINATION IP ADDRESS FOR TRANSLATION | - | - |
| | DESTINATION PORT NUMBER FOR TRANSLATION | - | - |
| | SEQUENCE NUMBER DIFFERENCE | - | - |
| | ACK NUMBER DIFFERENCE | - | - |
| CONSISTENCY DURATION (ms) | | 1000 | 1000 |
| EVENT FLAG (PACKET) | | OFF | OFF |
| EVENT FLAG (HEADER) | | OFF | OFF |

F I G. 2 3

SESSION TABLE 22a'

| SESSION ID | | 0 | 1 | 2 | 5 |
|---|---|---|---|---|---|
| SESSION SEARCH KEY | SOURCE IP ADDRESS | 192.168.50.5 | 192.168.1.5 | 192.168.30.30 | 192.168.200.10 |
| | SOURCE PORT NUMBER | 16321 | 8080 | 11950 | 8080 |
| | PROTOCOL | TCP | TCP | TCP | TCP |
| | DESTINATION IP ADDRESS | 192.168.1.5 | 192.168.50.5 | 192.168.200.1 | 192.168.200.1 |
| | DESTINATION PORT NUMBER | 8080 | 16321 | http | 3333 |
| | INPUT INTERFACE | 0 | 1 | 0 | 1 |
| SESSION STATE | | ESTAB | ESTAB | ESTAB | ESTAB |
| OUTPUT DESTINATION INTERFACE | | 1 | 0 | 1 | 0 |
| APPLIED SERVICE TYPE | | SERVER TRANSFER: OFF FILTERING AND PASSING | SERVER TRANSFER: OFF FILTERING AND PASSING | SERVER TRANSFER: OFF HEADER REWRITE | SERVER TRANSFER: OFF HEADER REWRITE |
| SERVICE-SPECIFIC INFORMATION | SOURCE IP ADDRESS FOR TRANSLATION | – | – | – | 192.168.200.1 |
| | SOURCE PORT NUMBER FOR TRANSLATION | – | – | – | http |
| | DESTINATION IP ADDRESS FOR TRANSLATION | – | – | 192.168.200.10 | 192.168.30.30 |
| | DESTINATION PORT NUMBER FOR TRANSLATION | – | – | 8080 | 11950 |
| | SEQUENCE NUMBER DIFFERENCE | – | – | 2334 | 14733 |
| | ACK NUMBER DIFFERENCE | – | – | 54654 | 8002 |
| CONSISTENCY DURATION (ms) | | 1000 | 1000 | 3000 | 3000 |
| EVENT FLAG (PACKET) | | OFF | OFF | OFF | OFF |
| EVENT FLAG (HEADER) | | OFF | OFF | OFF | OFF |

FIG. 24

SESSION TABLE 22a'

| SESSION ID | | 6 | 7 | 8 | 9 |
|---|---|---|---|---|---|
| SESSION SEARCH KEY | SOURCE IP ADDRESS | 192.168.2.100 | 192.168.25.250 | 192.168.2.100 | 192.168.25.250 |
| | SOURCE PORT NUMBER | 3001 | 21 | 3002 | 20 |
| | PROTOCOL | TCP | TCP | TCP | TCP |
| | DESTINATION IP ADDRESS | 192.168.25.250 | 192.168.2.100 | 192.168.25.250 | 192.168.2.100 |
| | DESTINATION PORT NUMBER | 21 | 3001 | 20 | 3002 |
| | INPUT INTERFACE | 0 | 1 | 0 | 1 |
| SESSION STATE | | ESTAB | ESTAB | ESTAB | ESTAB |
| OUTPUT DESTINATION INTERFACE | | 1 | 0 | 1 | 0 |
| APPLIED SERVICE TYPE | | SERVER TRANSFER: ON FTP FILTERING | SERVER TRANSFER: ON FTP FILTERING | FILTERING AND PASSING | FILTERING AND PASSING |
| SERVICE-SPECIFIC INFORMATION | SOURCE IP ADDRESS FOR TRANSLATION | — | — | — | — |
| | SOURCE PORT NUMBER FOR TRANSLATION | — | — | — | — |
| | DESTINATION IP ADDRESS FOR TRANSLATION | — | — | — | — |
| | DESTINATION PORT NUMBER FOR TRANSLATION | — | — | — | — |
| | SEQUENCE NUMBER DIFFERENCE | — | — | — | — |
| | ACK NUMBER DIFFERENCE | — | — | — | — |
| CONSISTENCY DURATION (ms) | | 1000 | 1000 | 3000 | 3000 |
| EVENT FLAG (PACKET) | | OFF | OFF | OFF | OFF |
| EVENT FLAG (HEADER) | | OFF | OFF | OFF | OFF |

CONTROL CONNECTION (sessions 6, 7)
DATA CONNECTION (sessions 8, 9)

F I G. 2 5

| SESSION ID | | 0 | 1 | 2 | 3 | 4 | 5 | 6 | 7 |
|---|---|---|---|---|---|---|---|---|---|
| SESSION SEARCH KEY | SOURCE IP ADDRESS | 192.168.50.5 | 192.168.1.5 | 192.168.30.30 | 192.168.200.1 | 192.168.200.1 | 192.168.200.1 | 192.168.200.10 | 192.168.25.250 |
| | SOURCE PORT NUMBER | 16321 | 8080 | 11950 | http | 3333 | 8080 | 3001 | 21 |
| | PROTOCOL | TCP | TCP | TCP | TCP | TCP | TCP | TCP | TCP |
| | DESTINATION IP ADDRESS | 192.168.1.5 | 192.168.50.5 | 192.168.200.1 | 192.168.30.30 | 192.168.200.10 | 192.168.200.1 | 192.168.25.250 | 192.168.2.100 |
| | DESTINATION PORT NUMBER | 8080 | 16321 | http | 11950 | 8080 | 3333 | 21 | 3001 |
| | INPUT INTERFACE | 0 | 1 | 0 | Server | Server | 1 | 0 | 1 |
| SESSION STATE | | IN SYN | IN SYN | ESTAB | ESTAB | IN SYN | IN SYN | IN SYN | IN SYN |
| ASSOCIATED SESSION | | — | — | 4 | 5 | 2 | 3 | — | — |
| APPLIED SERVICE TYPE | | SERVER TRANSFER: ON URL FILTERING | SERVER TRANSFER: ON URL FILTERING | SERVER TRANSFER: ON URL LOAD BALANCING | SERVER TRANSFER: ON URL LOAD BALANCING | SERVER TRANSFER: ON URL LOAD BALANCING | SERVER TRANSFER: ON URL LOAD BALANCING | SERVER TRANSFER: ON FTP FILTERING | SERVER TRANSFER: ON FTP FILTERING |

F I G. 2 6

TABLE FOR URL FILTERING

| URL | PASSING/DISCARDING |
|---|---|
| www.xxx.com | DISCARDING |
| www2.yyy.co.jp | DISCARDING |
| bbb.ne.jp/~abc | DISCARDING |
| aaa.bbb.or.jp | DISCARDING |

TABLE FOR FTP FILTERING

| IP ADDRESS:PORT NUMBER | PASSING/DISCARDING |
|---|---|
| 192.168.1.5:Any | PASSING |
| 192.168.2.100:Any | PASSING |
| 192.168.150.*:Any | PASSING |
| 192.168.250.*:Any | PASSING |

TABLE FOR URL LOAD BALANCING

| URL | DISTRIBUTION DESTINATION |
|---|---|
| www.aaa.com | DISTRIBUTION DESTINATION 1: 192.168.200.10<br>DISTRIBUTION DESTINATION 2: 192.168.200.11<br>DISTRIBUTION DESTINATION 3: 192.168.200.12<br>DISTRIBUTION DESTINATION 4: 192.168.200.13<br>DISTRIBUTION METHOD: ROUND ROBIN |
| www.bbb.co.jp | DISTRIBUTION DESTINATION 1: 192.168.200.20<br>DISTRIBUTION DESTINATION 2: 192.168.200.21<br>DISTRIBUTION DESTINATION 3: 192.168.200.22<br>DISTRIBUTION METHOD: ROUND ROBIN |
| www.ccc.ne.jp | DISTRIBUTION DESTINATION 1: 192.168.200.30<br>DISTRIBUTION DESTINATION 2: 192.168.200.31<br>DISTRIBUTION METHOD: ROUND ROBIN |
| www.ddd.ne.jp/~abc | DISTRIBUTION DESTINATION 1: 192.168.200.40<br>DISTRIBUTION DESTINATION 2: 192.168.200.41<br>DISTRIBUTION DESTINATION 3: 192.168.200.42<br>DISTRIBUTION DESTINATION 4: 192.168.200.43<br>DISTRIBUTION METHOD: ROUND ROBIN |

FIG. 27

| GROUP ID | FLAG |
|---|---|
| 0 | 0 |
| 1 | 0 |
| 2 | 1 |
| ⋮ | ⋮ |
| 255 | 0 |

1: VALID, 0: INVALID

FIG. 36

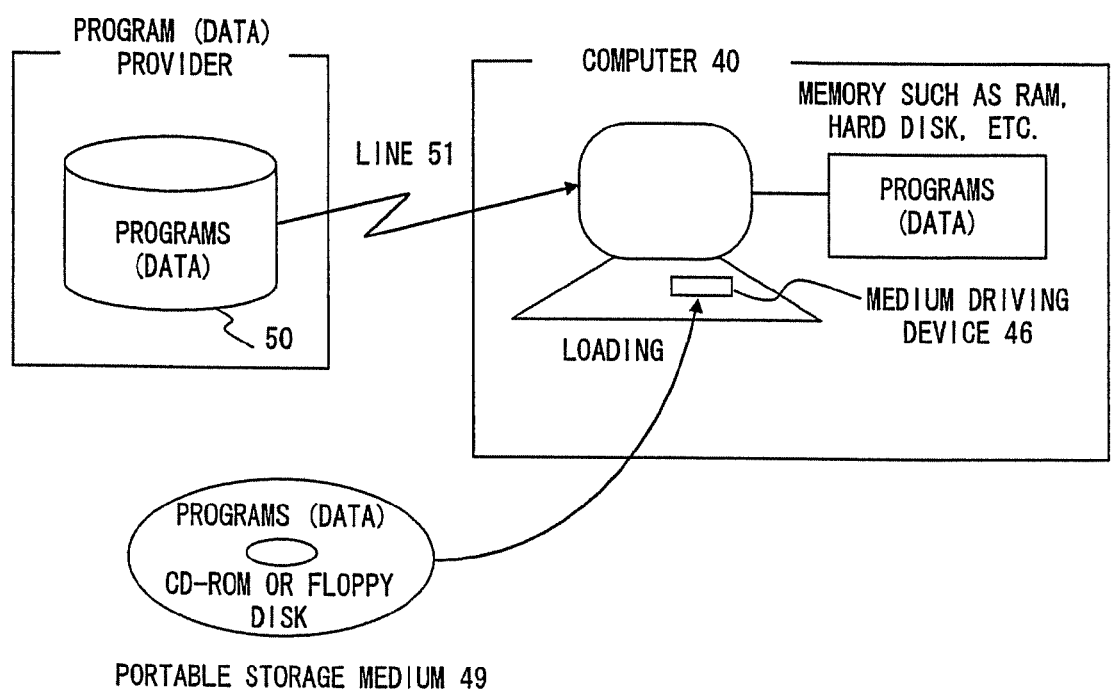
F I G. 3 8

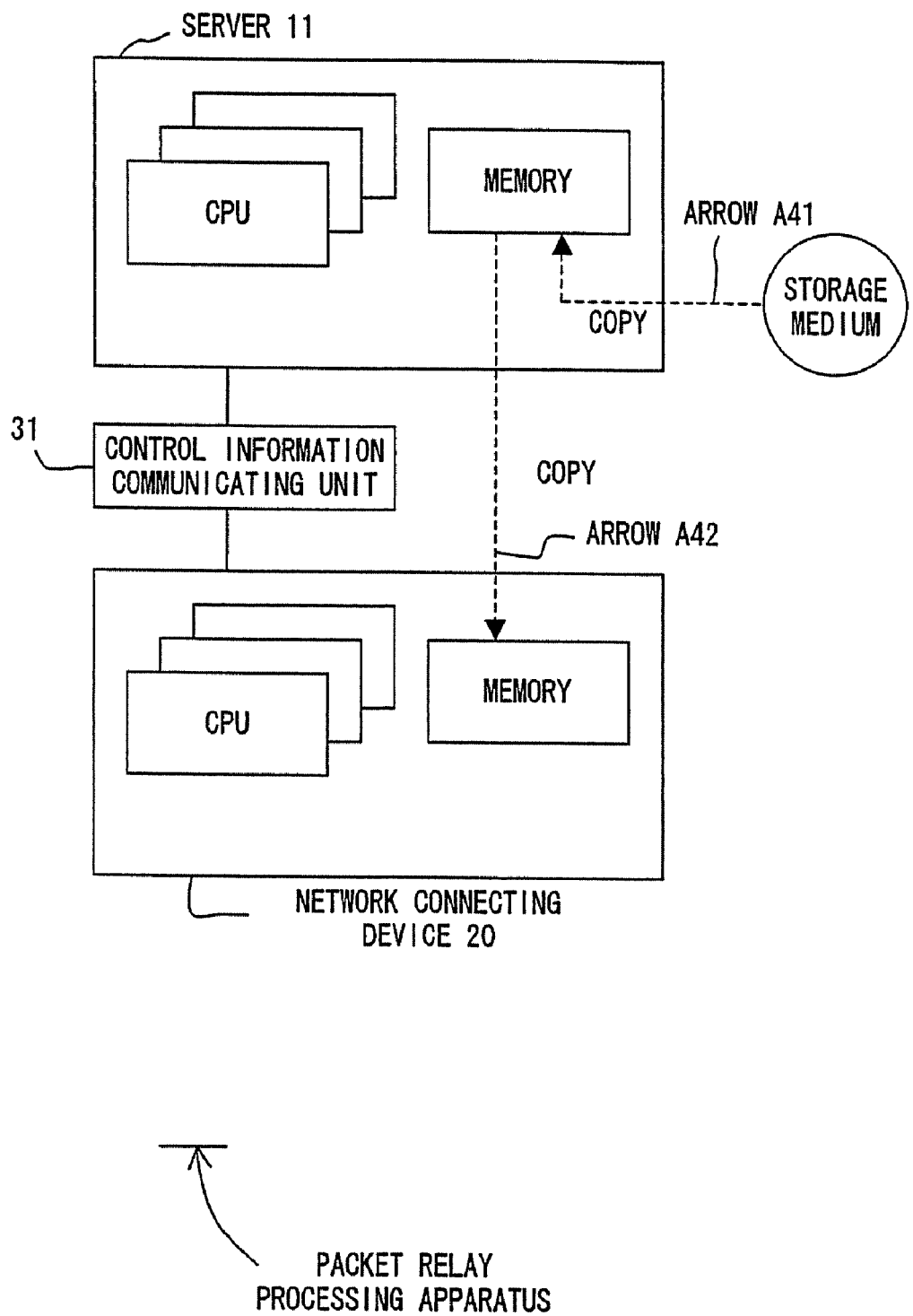
F I G. 39

PACKET RELAY PROCESSING APPARATUS

CROSS REFERENCE TO RELATED APPLICATION

This application is a Continuation of application Ser. No. 10/056,091 filed Jan. 28, 2002, now U.S. Pat. No. 7,107,348, the entire contents of which are incorporated by reference herein.

BACKGROUND OF THE INVENTION

1. Field of the Invention

The present invention relates to a packet relay processing apparatus optimizing a server which has a server load balancing control capability, a NAT (Network Address Translation) capability, a bandwidth control capability, a VPN (Virtual Private Network) capability, and a firewall service capability.

2. Description of the Related Art

With the recent popularization of the WWW (World Wide Web), and packet communication services of e-mail and cellular phones, the Internet has been rapidly expanding. Because of this phenomenon, the demands for speeding up networks and for enhancing capabilities such as security, etc. have been rising. A current network service is normally implemented by a configuration composed of a server and a network connecting device such as a NIC (Network Interface Card), etc. Since recent network services have been becoming complex, a platform implemented by a server is suitable in terms of being able to flexibly meet diverse and new demands.

FIG. 1 shows the configuration of a conventional packet relay processing apparatus. The packet relay processing apparatus shown in this figure has a general configuration such that a server and network connecting devices implement services on a network. In FIG. 1, thin arrows indicate the flow of control information, whereas thick arrows indicate the flow of packet information.

In this figure, the server 100 comprises a packet processing unit 101, service 1 to n processing units 102, and service 1 to n controlling units 103.

The service 1 to n processing units 102 perform session management and routing according to a policy set by the service 1 to n controlling units 103, and further perform service processes such as filtering, load balancing, etc.

A packet that is input from a network via a network connecting unit 106 is transmitted to the packet processing unit 101 of the server 100 via any of the network connecting devices 104 and any of packet communicating units 105. Then, the packet is processed by the packet processing unit 101.

Since the Internet has been quickly becoming larger in recent years, the amount of packets flowing on a network has been exhibiting an exponential growth. For this reason, the above described conventional server is almost unable to meet the requested processing speed, and a technique for speeding up the processing speed of a server is demanded. At the same time, it is desirable to lose the advantage of being able to integrate many services of a server as little as possible when creating a new platform.

SUMMARY OF THE INVENTION

An object of the present invention is to speed up service processes of a server by arranging a process shared by many network services in a network connecting device.

The present invention relates to a packet relay processing apparatus having a server and a network connecting device.

To overcome the above described problem, according to one aspect of the present invention, a network connecting device, which configures a packet relay processing apparatus relaying a packet, comprises a session managing unit managing a session, and a packet processing unit relaying a packet based on the session management made by the session managing unit.

With this configuration, the network connecting device performs a packet relay process based on the session management that a server conventionally makes. As a result, the load on the server can be reduced, thereby speeding up the service process performed by the server.

Furthermore, in the above described configuration, the network connecting device may further comprise a routing table storing routing information about the routing destination of a packet, and a routing processing unit determining the routing destination of the packet at the start of a session based on the routing information. The packet processing unit outputs the packet to the routing destination determined by the routing processing unit. As a result, the consistency of a service process can be maintained for the session currently being continued, even if the routing information is changed during the session. Here, the server may comprise a network controlling unit, which registers routing information to the routing table.

According to another aspect of the present invention, the network connecting device further comprises a server transferring unit in addition to the session managing unit and the packet processing unit, and the server comprises an external session managing unit. The session managing unit transfers session information about a session to the server based on a given condition. The external session managing unit within the server manages the session based on the received session information. As a result, it becomes possible to make the network connecting device or the server perform session management depending on a condition.

According to a further aspect of the present invention, the network connecting device further comprises a session table storing information about a session, and a policy table storing a policy which describes a rule for applying a service for a packet, in addition to the session managing unit and the packet processing unit. Upon receipt of a packet, the session managing unit searches the session table by using information included in the packet as a search key. If corresponding session information is not registered to the session table as a result of the search, the session managing unit obtains a corresponding policy from the policy table by further using the information included in the packet as a search key, and writes session information to the session table based on the obtained policy.

If corresponding session information is registered as a result of the search, the session managing unit manages the session information stored in the session table based on the state of the session. Also in this way, the consistency of a service process can be maintained for the session currently being continued, even if routing information is changed during the session.

According to a still further aspect of the present invention, the network connecting device further comprises a process distributing unit, and a plurality of service processing units in addition to the session managing unit and the packet processing unit. The process distributing unit distributes a packet to at least one of the plurality of service processing units based on the contents of a service for the packet. The service processing unit to which the packet is distributed performs a service process for the packet.

As a result, it becomes possible to make the network connecting device, which can perform a service process faster than a server, perform at least some of service processes that the server conventionally performs.

Additionally, in the above described configuration, the process distributing unit may transfer a packet to the server based on a given condition. In this case, the server, which configures the packet relay processing apparatus relaying a packet, comprises an external service processing unit receiving a packet transferred from the process distributing unit, and applying a service for the packet. With this configuration, it becomes possible to make the network connecting device or the server apply the service for a packet depending on a condition.

Furthermore, in the above described configuration, the server may further comprise a packet details analyzing unit determining the contents of a service for a packet by analyzing the packet upon receipt of the packet transferred from the process distributing unit, and setting the contents of the determined service in the network connecting device. After the contents of the determined service are set, the network connecting device processes subsequent packets based on the contents of the determined service. Namely, once a packet is analyzed by the server at the start of a session, the network connecting device processes subsequent packets based on an analysis result. Therefore, the load on the server can be reduced, and a packet can be processed faster. Also in this case, the consistency of a service process can be maintained for a session currently being continued, even if routing information is changed during the session.

BRIEF DESCRIPTION OF THE DRAWINGS

The features and advantages of the present invention will be more clearly appreciated from the following description taken in conjunction with the accompanying drawings in which like elements are denoted by like reference numerals and in which:

FIG. 3 shows the configuration of a packet relay processing apparatus according to a first preferred embodiment of the present invention;

FIG. 7 exemplifies the configuration of a session table;

FIG. 9 explains the state transition from the start to the end of a TCP session;

FIG. 11 shows the configuration of a packet relay processing apparatus according to a second preferred embodiment of the present invention;

FIG. 14 exemplifies the configuration of a session table according to the third preferred embodiment;

FIG. 15 exemplifies the configuration of a policy table according to the third preferred embodiment;

FIG. 22 exemplifies a session table before details of a packet are analyzed in the fifth preferred embodiment (No. 1);

FIG. 23 exemplifies the session table before the details of the packet are analyzed in the fifth preferred embodiment (No. 2);

FIG. 24 exemplifies the session table after the details of the packet are analyzed in the fifth preferred embodiment (No. 1);

FIG. 25 exemplifies the session table after the details of the packet are analyzed in the fifth preferred embodiment (No. 2);

FIG. 26 exemplifies the configuration of a session table for details analysis;

FIG. 27 exemplifies the configuration of a policy table for details analysis;

FIG. 36 exemplifies the data configuration of a flag table;

FIG. 38 explains a storage medium or a transmission signal, which provides programs and data to a computer; and FIG. 39 explains the loading of programs and data into a server and a network connecting device.

DESCRIPTION OF THE PREFERRED EMBODIMENTS

Figure 2:
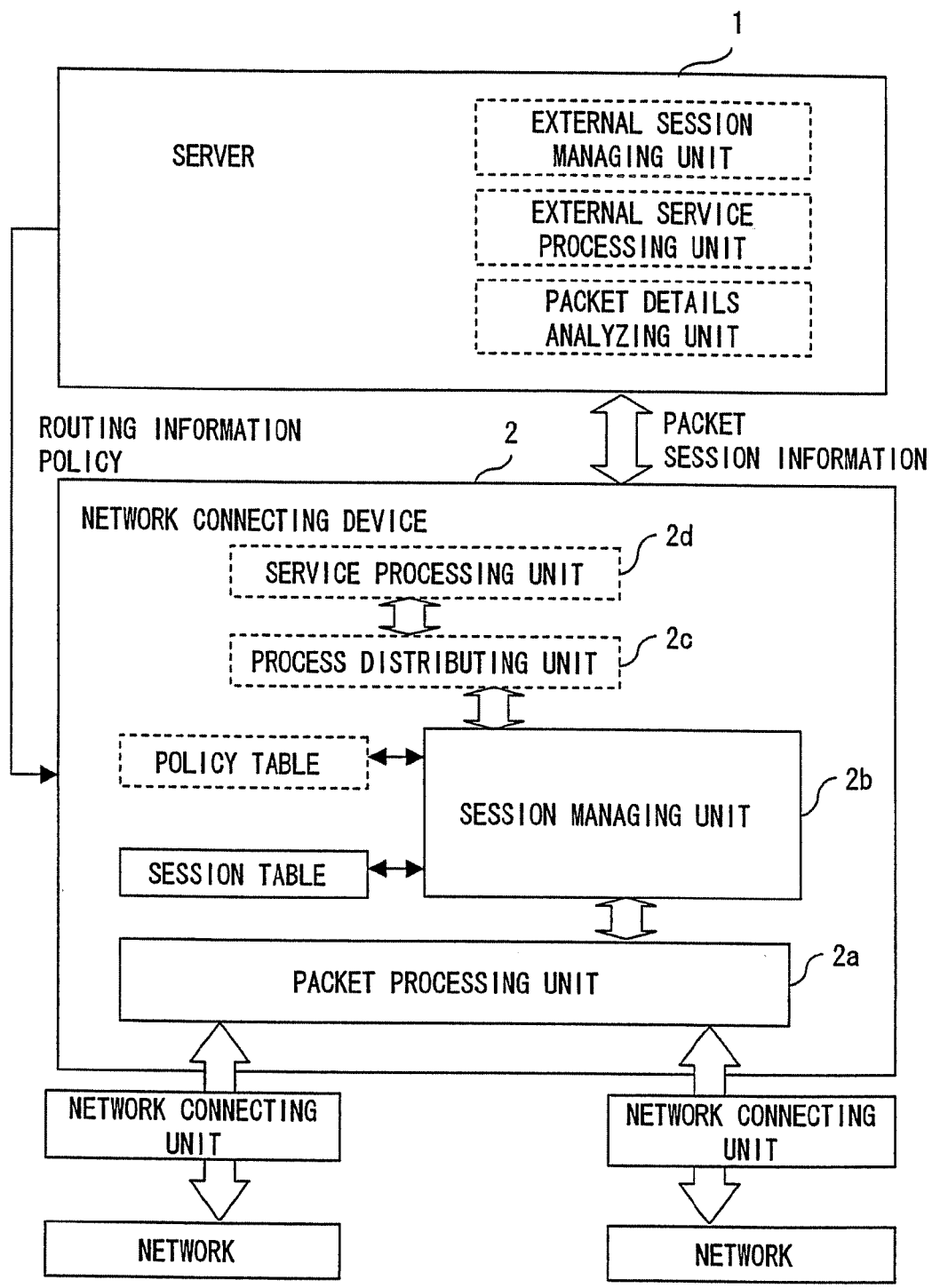
FIG. 2 explains the outline of the present invention.

FIG. 2 explains the outline of the present invention. In this figure, a packet relay processing apparatus comprises a server 1 and a network connecting device 2. According to the present invention, a packet processing unit and a session managing unit, which are conventionally arranged in a server, are arranged in the network connecting device 2 so that a packet relay processing unit is configured. With the packet relay processing unit, a packet relay process based on session management is performed in the network connecting device 2.

Additionally, a process distributing unit 2c and a plurality of service processing units 2d are arranged in the network connecting device 2, so that the process distributing unit 2c distributes a packet to the plurality of service processing units 2d based on session management according to a policy set by the server 1.

Furthermore, an external session managing unit is arranged in the server 1. If the number of sessions exceeds the number registered to a session table of the network connecting device 2, session management can be made also by the server 1.

Still further, the packet relay processing apparatus can be configured in a way such that an external service processing unit is arranged in the server 1, the process distributing unit 2c transfers a packet to the server 1, and the external service processing unit within the server 1 is made to perform a service process. The packet relay processing apparatus can be configured also in a way such that a packet details analyzing unit is arranged in the server 1, which analyzes a packet to determine a service, and sets the contents of the determined service in the network connecting device 2, and thereafter, the network connecting device 2 performs a relay process for the same session based on the contents of the determined service.

As stated earlier, according to the present invention, the above described object is attained as follows.

(1) A packet relay processing unit, which is composed of the packet processing unit 2a and the session managing unit 2b, is arranged in the network connecting device 2, so that the network connecting device 2 performs a relay process based on session management.

As described above, the network connecting device 2 executes capabilities that are conventionally arranged in a server, thereby reducing the CPU use ratio of the server 1. Additionally, the network connecting device 2 makes session management, and registers an output destination to the session table at the start of a session. As a result, the consistency of a session currently being continued can be maintained even if a routing table is changed during the session.

(2) In the above described (1), an external session managing unit is arranged in the server 1 of the packet relay processing apparatus, and the network connecting device 2 transfers session information to the server 1 depending on a given condition, so that the server 1 makes session management.

As a result, a session which overflows in the network connecting device 2 can be managed by the server 1, even if the number of sessions exceeds the number which can be registered to the session table of the network connecting device 2.

(3) In the above described (1), a process distributing unit 2c and a plurality of service processing units 2d are arranged in the network connecting device 2, so that the process distributing unit 2c distributes a packet to any of the plurality of service processing units 2d, and the service processing unit 2d to which the packet is distributed is made to perform a service process.

As described above, the process distributing unit 2c and the plurality of service processing units 2d are arranged in the network connecting device 2 that can perform a process faster than the server 1, thereby reducing the CPU use ratio of the server 1, and speeding up a service process.

(4) In the above described (3), an external service processing unit is arranged in the server 1, so that the process distributing unit 2c distributes a packet depending on a given condition, and the external service processing unit within the server 1 is made to perform a service process.

As described above, a service process can be performed by both the network connecting device 2 and the server 1, whereby a service process that is difficult to be implemented on the network connecting device 2 can be performed by the server 1, and also the case where a network service requires a complex process can be coped with.

(5) In the above described (1), a process distributing unit 2c and service processing units 2d are arranged in the network connecting device 2, and a packet details analyzing unit (not shown) is arranged in the server 1, so that the process distributing unit 2c transfers a packet to the server 1 depending on a given condition, and the server 1 analyzes the packet to determine a service, and sets the contents of the determined service in the network connecting device 2, which performs a relay process for packets belonging to the session based on the set contents of the service thereafter.

As described above, the server 1 analyzes a packet to determine a service, and sets the contents of the determined service in the network connecting device 2, and the network connecting device 2 performs a relay process for the same session based on the contents of the determined service thereafter. As a result, a service process can be performed faster in comparison with the case where the server 1 performs all of the service processes.

FIG. 3 shows the configuration of a packet relay processing apparatus according to a first preferred embodiment of the present invention. As shown in this figure, a server 11 comprises a network controlling unit 12. The network controlling unit 12 writes routing information input by an administrator to a routing table 23a of a network connecting device 20 via a control information communicating unit 31. The control information communicating unit 31 is, for example, a PCI (Peripheral Components Interconnect) bus or a serial interface.

Figure 1:
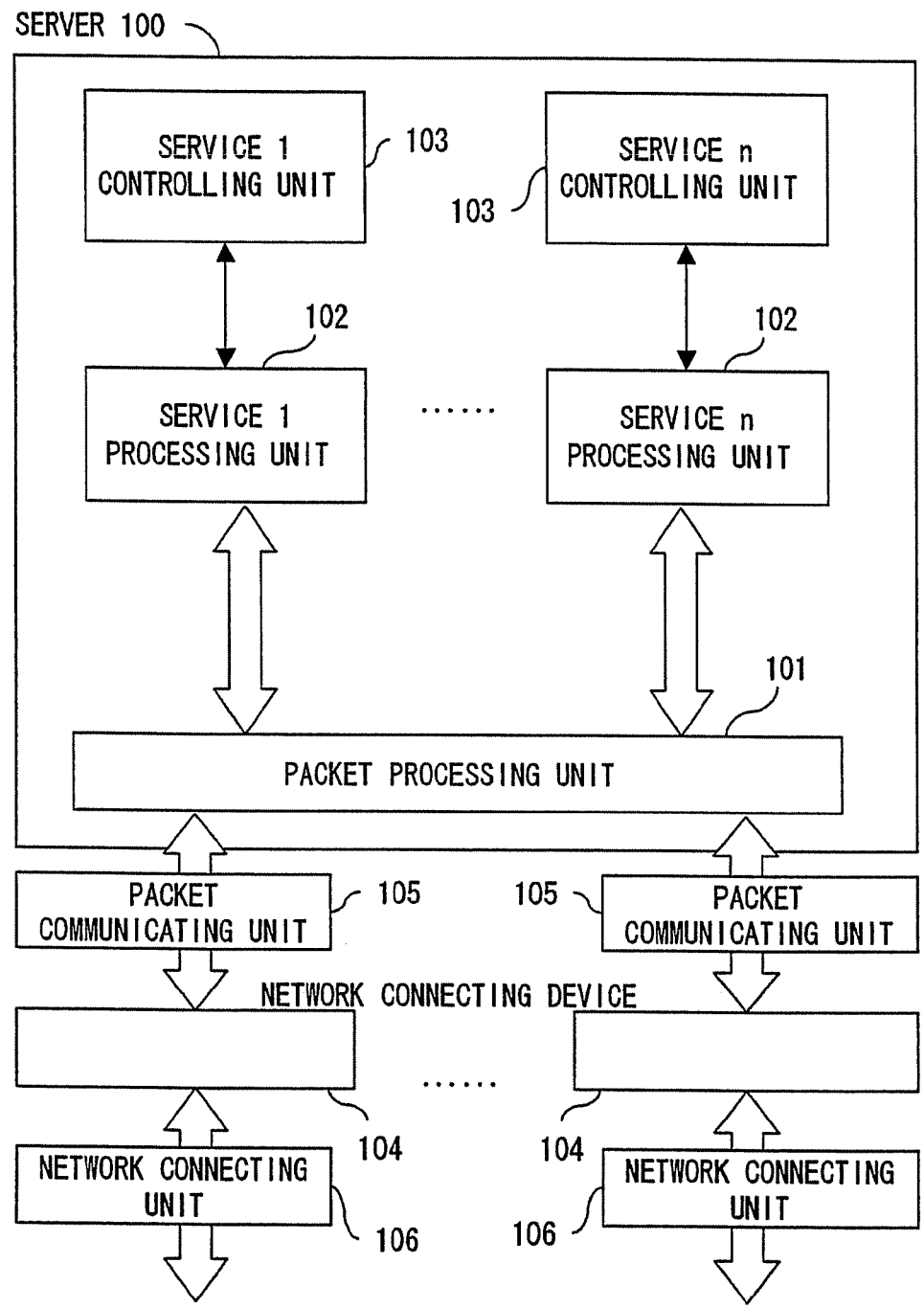
FIG. 1 shows the configuration of a conventional packet relay processing apparatus.

The network connecting device 20 according to this preferred embodiment is a device into which a plurality of network connecting devices 104 shown in FIG. 1 are integrated, and comprises a packet processing unit 21, a session managing unit 22, a session table 22a, a routing processing unit 23, and a routing table 23a. The network connecting device 20 performs a packet process, session management, a routing process, etc., which are conventionally performed by the server shown in FIG. 1.

Figure 4:
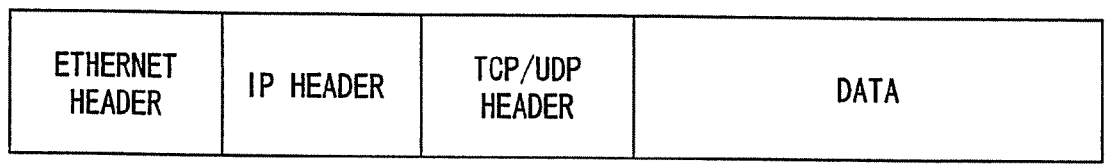
FIG. 4 shows the structure of a transfer packet.

In FIG. 3, a packet input from a network is transmitted to the packet processing unit 21 of the network connecting device 20 via a network connecting unit 30. The network connecting unit 30 is, for example, an Ethernet (registered trademark) controller. FIG. 4 exemplifies the structure of a packet in the case where the network connecting unit 30 is an Ethernet controller. As shown in this figure, a packet is composed of a header portion and a data portion.

Figure 5:
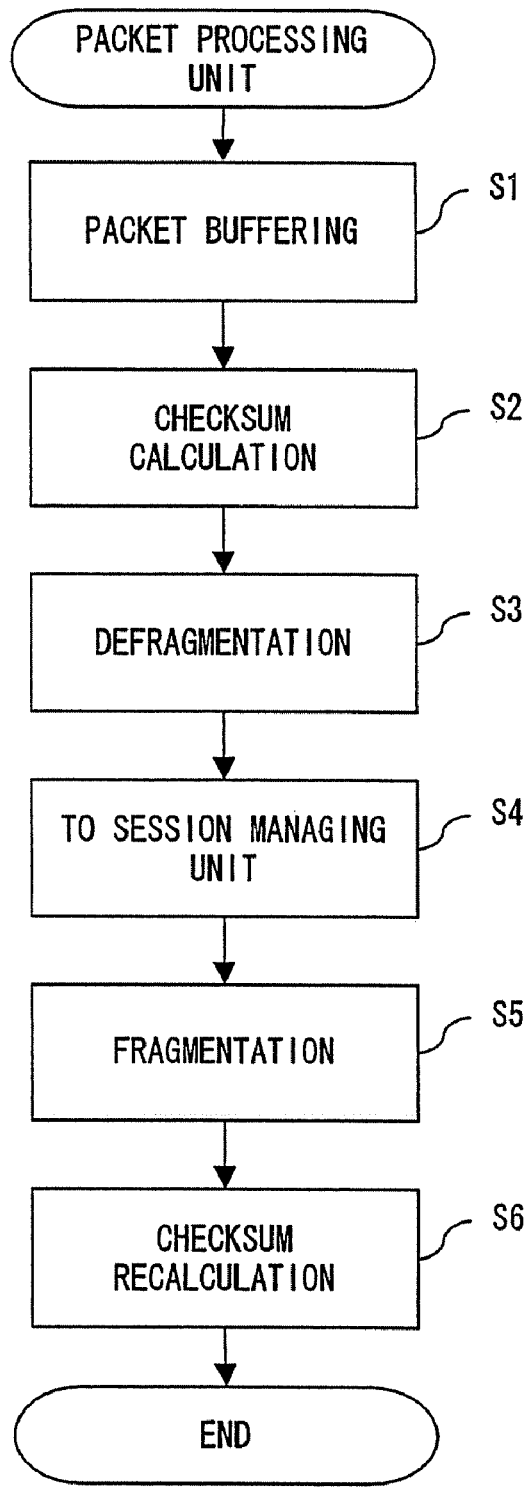
FIG. 5 is a flowchart showing the process performed by a packet processing unit.
Figure 6:
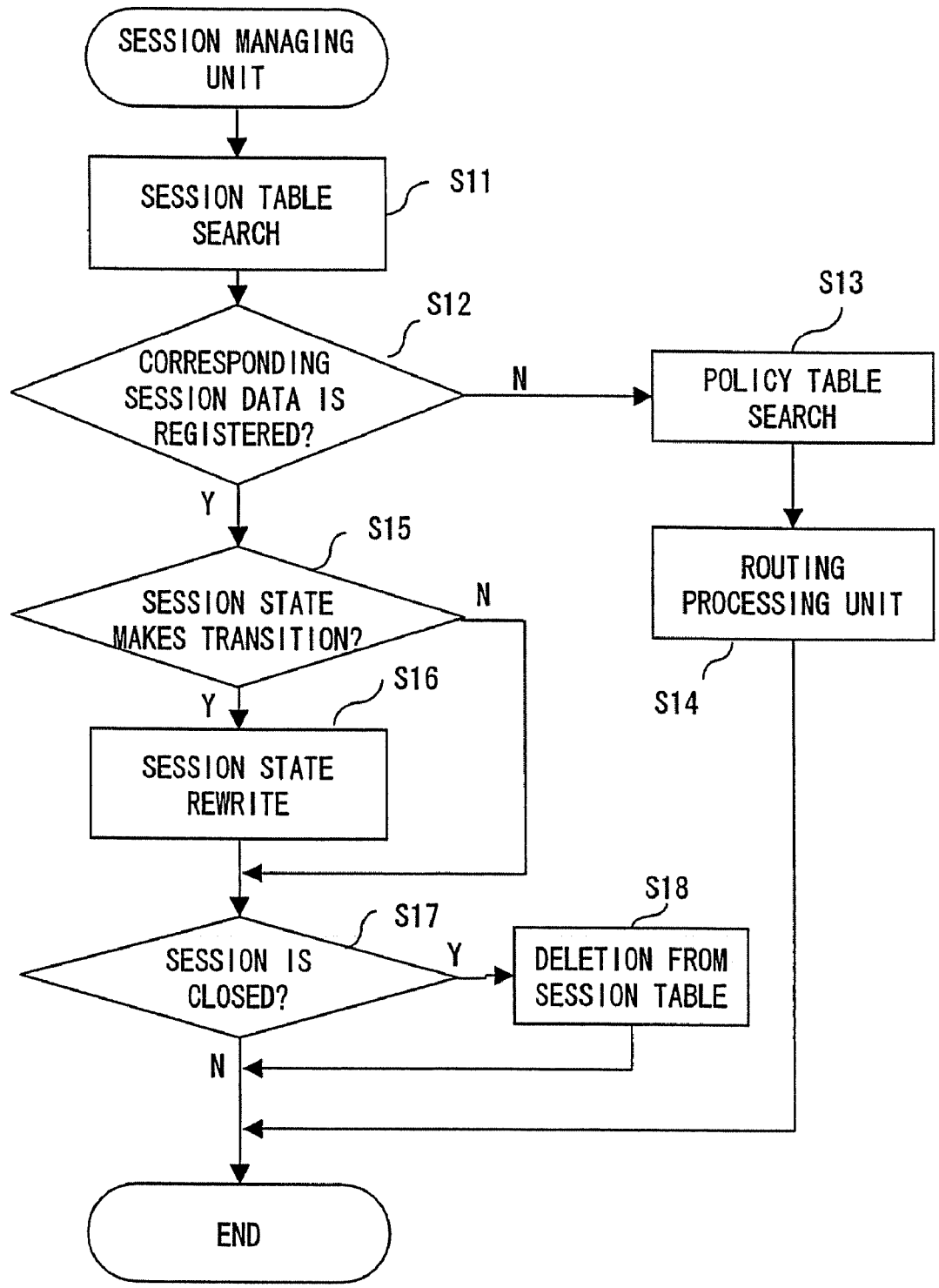
FIG. 6 is a flowchart showing the process performed by a session managing unit.

The packet processing unit 21 performs a process represented by a flowchart that is shown in FIG. 5 and will be described later, and transmits a packet to the session managing unit 22. The session managing unit 22 makes session management as represented by a flowchart that is shown in FIG. 6 and will be described later, and passes the packet to the packet processing unit 21.

Then, the packet processing unit 21 processes the packet as shown in FIG. 5 to be described later, and outputs the packet to the network via the network connecting unit 30.

FIG. 5 is a flowchart showing the process performed by the packet processing unit.

As shown in this figure, the packet processing unit 21 buffers a packet input from a network (step S1), and calculates a checksum (step S2). Next, the packet processing unit 21 defragments the packet (step S3), and transmits the packet to the session managing unit 22 (step S4).

Then, the packet processing unit 21 fragments the packet transmitted from the session managing unit 22 (step S5), recalculates a checksum (step S6), and outputs the packet to the network. Note that the process performed by the packet processing unit 21 is the same as that performed by a conventional packet processing unit.

FIG. 6 is a flowchart showing the process performed by the session managing unit 22.

As shown in this figure, when a packet is input to the session managing unit 22, the session managing unit 22 searches the session table 22a for the session data corresponding to the packet (step S11). The session table 22a is a table storing session data for managing a session. FIG. 7 exemplifies the configuration of the session table 22a. As shown in this figure, session data includes as entries a session ID (IDentifier) for identifying a session, a session search key (destination and source addresses, destination and source ports, and a protocol) for uniquely determining a session, session state, an output destination, etc.

In step S11, the session managing unit 22 searches the session table 22a by using as a session search key information such as the source/destination IP address within an IP header of the packet, a protocol within a TCP header, a source/destination port, etc.

If corresponding session data whose session search key matches the information within the header of the packet input to the session managing unit 22 is not registered to the session table 22a ("NO" in step S12), this packet is the initial packet of a certain session. The session managing unit 22 therefore registers the session data of this session to the session table 22a (step S13). Namely, in step S13, the session managing unit 22 writes the session search key (destination and source addresses, destination and source ports, and a protocol), and the state of the session to the session table 22a shown in FIG. 6 based on the information within the header of the input packet.

Then, the routing processing unit 23 searches the routing table 23a, and writes the output destination resultant from the search to the session table 22a (step S14).

If corresponding session data whose session search key matches the information within the header of the packet is registered to the session table 22a ("YES" in step S12), the session managing unit 22 monitors the state of the session, and determines whether or not the state makes a transition (step S15). If the state makes a transition ("YES" in step S15), the session managing unit 22 rewrites the session state within the session table 22a (step S16).

If the state transition of the session terminates and the session is closed, namely, if the session state is TIME_WAIT and CLOSED ("YES" in step S17), the session managing unit 22 deletes the session data of the session including the session search key, the session state, the output destination, etc. from the session table 22a (step S18). Then, the processed packet is transmitted to the output destination. If the session state is not CLOSED ("NO" in step S17), the session managing unit 22 does not perform the operation of step S18, and the processed packet is transmitted to the output destination.

Determination of the above described station transition differs depending on whether a protocol is either TCP (Transmission Control Protocol) or a different protocol. Hereinafter, explanation is provided respectively for the TCP and the different protocol.

Figure 8:
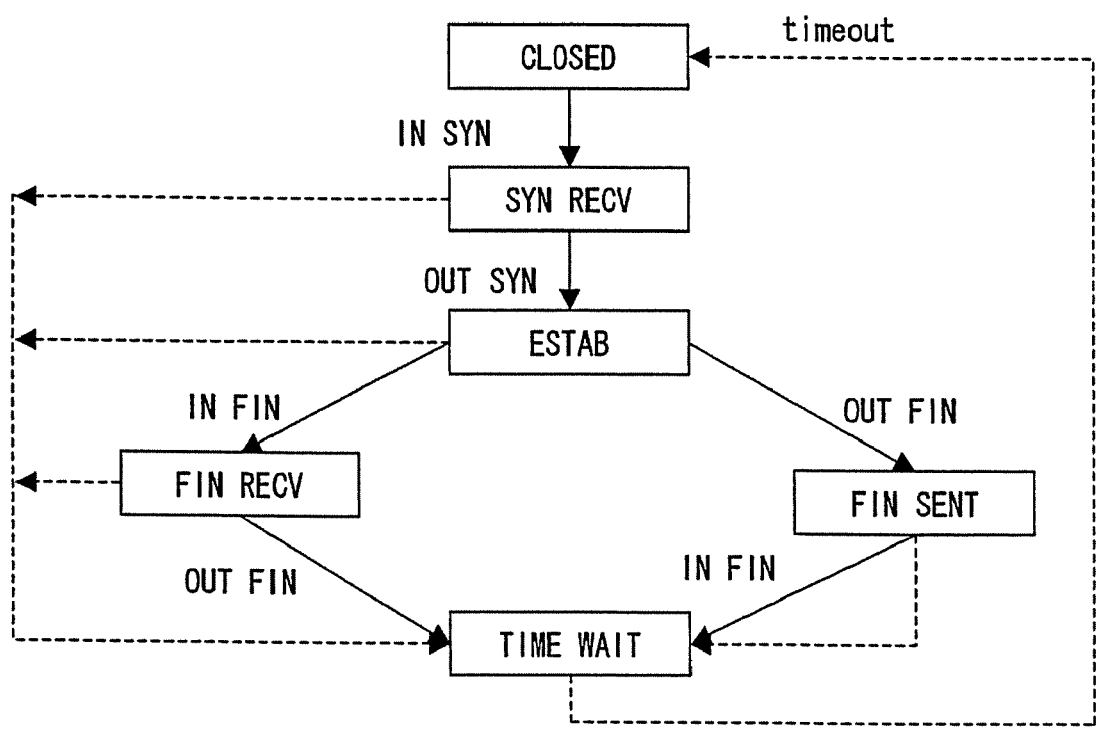
FIG. 8 shows the state transition of a TCP session.

FIG. 8 shows the states of a TCP session. As shown in this figure, six states such as CLOSED, SYN_RECV, ESTAB, FIN_RECV, FIN_SENT, and TIME_WAIT are set as the states of the TCP session.

To the entry "session state" in the session table 22a, any of the above described 5 states except for CLOSED is written as shown in FIG. 7.

If a session is not registered, its state is CLOSED. Upon arrival of a SYN packet in this state, the session state makes a transition to SYN_RECV. At this time, the session managing unit 22 rewrites the entry "session state" of the session table 22a to SYN_RECV. Then, the session state makes a transition to ESTAB (Established) state in which a packet is transmitted/received. Upon arrival of a FIN packet, the session is terminated. Similarly, upon detection of the arrivals of SYN and FIN packets, the session managing unit 22 can detect the start and the end of a session.

FIG. 9 exemplifies the state transition from the start to the end of a TCP session.

As shown in this figure, if a communication is made between a client and a server, the client first transmits a SYN packet. Then, the server returns a SYN_ACK packet, and the client transmits an ACK packet to the server in response to the SYN_ACK packet. As a result, the session state makes a transition from SYN to ESTAB. Thereafter, the client and the server exchange packets. When the session is terminated, for example, the client transmits a FIN packet to the server, the server returns a FIN_ACK packet to the client, and the client then transmits an ACK packet to the server in response to the FIN_ACK packet. In this way, the session is terminated (the session state makes a transition to CLOSED).

Figure 10:
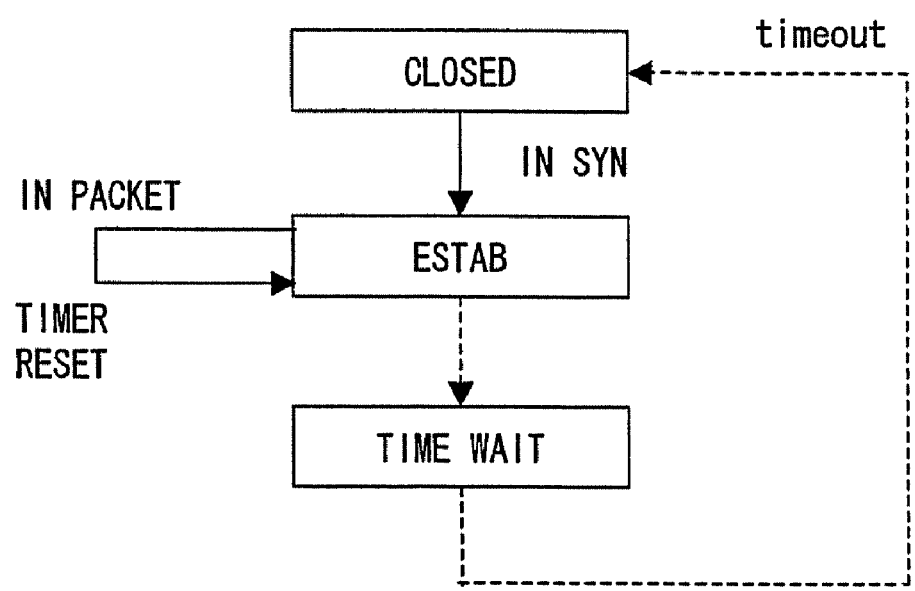
FIG. 10 shows the state transition of a UDP session.

For protocols other than the TCP, SYN and FIN flags do not exist in a packet. FIG. 10 exemplifies the state transition of a UDP (User Datagram Protocol) session. If a packet belonging to a session that is not registered to the session table 22a arrives as shown in FIG. 10, the session managing unit 22 sets the state of the session to ESTAB. Since the end of the session cannot be detected, the session managing unit 22 terminates the session by deleting the session data from the session from the session table 22a if a packet does not pass through for a predetermined time period according to a timer.

As described above, according to this preferred embodiment, the packet relay processing capability based on session management is arranged in the network connecting device 20, so that the capability that is conventionally arranged in the server 11 is implemented by the network connecting device 20, thereby reducing the CPU use ratio of the server 11.

Additionally, the session managing unit 22 is arranged in the network connecting device 20, and an output destination is registered to the session table 22a at the start of a session and packets belonging to the session are processed based on the registered information until the session is closed. As a result, the consistency of a session currently being continued can be maintained, even if routine information of the routing table 23a is changed during the session.

FIG. 11 shows the configuration of a packet relay processing apparatus according to a second preferred embodiment of the present invention. The packet relay processing apparatus according to this preferred embodiment is an apparatus implemented by further arranging a server transferring unit 24 transferring session information to the server 11, a session information communicating unit 32 communicating session information, an external session managing unit 13, and an external session table 13a in the packet relay processing apparatus according to the first preferred embodiment, which is shown in FIG. 3. When the session table 22a of the network connecting device 20 becomes full, the external session managing unit 13 arranged in the server 11 makes session management. The other operations are similar to those in the first preferred embodiment.

Figure 12:
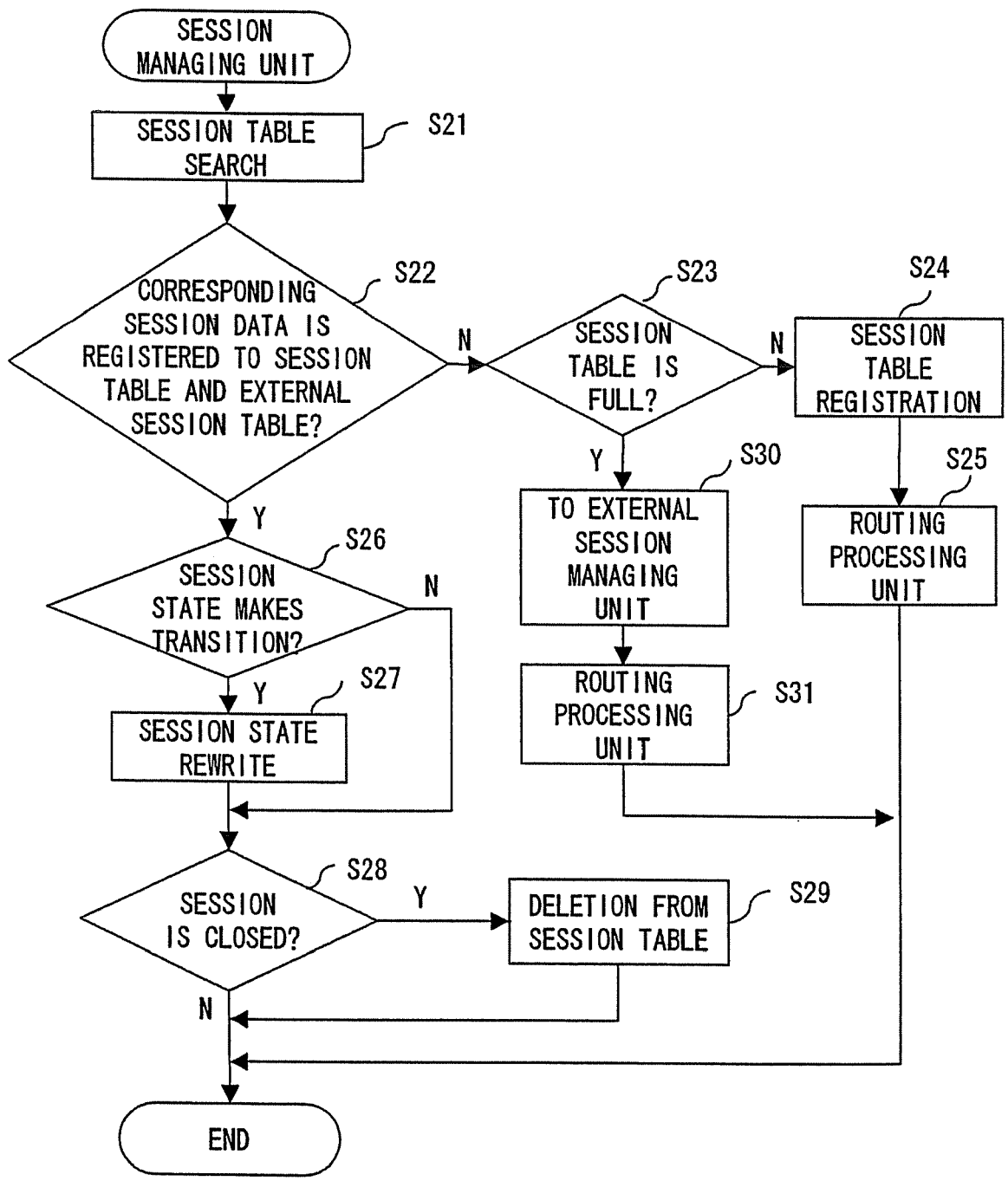
FIG. 12 is a flowchart showing the processes performed by a session managing unit and an external session managing unit according to the second preferred embodiment.

FIG. 12 is a flowchart showing the processes performed by the session managing unit and the external session managing unit in this preferred embodiment.

As shown in this figure, when a packet is input to the session managing unit 22, the session managing unit 22 and the external session managing unit 13 respectively search the session table 22a and the external session table 13a by using the information stored in the header of the packet as a search key (step S21). The session table 22a and the external session table 13a are tables storing information for managing a session, which are earlier explained with reference to FIG. 7.

If corresponding session data whose session search key matches the information within the header of the packet input to the session managing unit 22 is not registered to the session table 22a and the external session table 13a ("NO" in step S22), this packet is the initial packet of a session. The session managing unit 22 therefore determines whether or not the session table 22a is full (step S23).

If the session table 22a is not full ("NO" in step S23), the session managing unit 22 registers the session data of the session to the session table 22a as described above (step S24). Then, the routing processing unit 23 searches the routing table 23a, and writes a resultant output destination to the session table 22a (step S25).

If corresponding session data whose session search key matches the information within the header of the packet is registered to the session table 22a ("YES" in step S22), the session managing unit 22 monitors the state of the session, and determines whether or not the state makes a transition (step S26).

If the state makes a transition ("YES" in step S26), the session managing unit 22 rewrites the state of the session in the session data stored within the session table 22a (step S27).

After the state transition of the session terminates, the session managing unit 22 deletes the session data from the session table 22a (step S29) if the state of the session makes a transition to CLOSED ("YES" in step S28). The processed packet is transmitted to the output destination.

If the session table 22a is full when the initial packet of the session is registered ("YES" in step S23), the external session managing unit 13 within the server 11 performs a process similar to the above described one.

Namely, as explained in the above described steps S24 and S25, the external session managing unit 13 registers the session data of the session of the packet to the external session table 13a (step S30), and the routing processing unit 23 searches the routing table 23a, and writes a resultant output destination to the external session table 13a (step S31).

If corresponding session data whose session search key matches the information within the header of the packet is registered to the external session table 13a ("YES" in step S22), the external session managing unit 13 monitors the state of the session within the external session table 13a, and determines whether or not the state of the session makes a transition (step S26). If the state makes a transition, the external session managing unit 13 rewrites "session state" of the session data corresponding to the session within the external session table 13a (step S27). After the state transition of the session terminates, the external session managing unit 13 deletes the session data of the session from the session table 13a if the state of the session makes a transition to CLOSED ("YES" in step S28). As described above, according to this preferred embodiment, the packet relay processing capability based on session management is arranged in the network connecting device 20, so that the capability that is conventionally arranged in the server 1 is implemented by the network connecting device 20. As a result, the CPU use ratio of the server 11 can be reduced in a similar manner as in the first preferred embodiment. Additionally, as in the first preferred embodiment, the consistency of a session currently being continued can be maintained, even if the routing information in the routing table is changed during the session.

Furthermore, if the number of sessions exceeds the number that can be registered to the session table of the network connecting device 20, a session which overflows in the network connecting device 20 can be managed by the server 11. This is because the external session managing unit 13 arranged in the server 11 makes session management.

In the above provided explanation, the external session managing unit 13 is arranged in the server 11, which makes session management. However, only the external session table 13a maybe arranged in the server 11, and session management may be made by the session managing unit 22 of the network connecting device 20. Namely, a session which overflows in the session table 22a may be registered to the external session table 13a.

Figure 13:
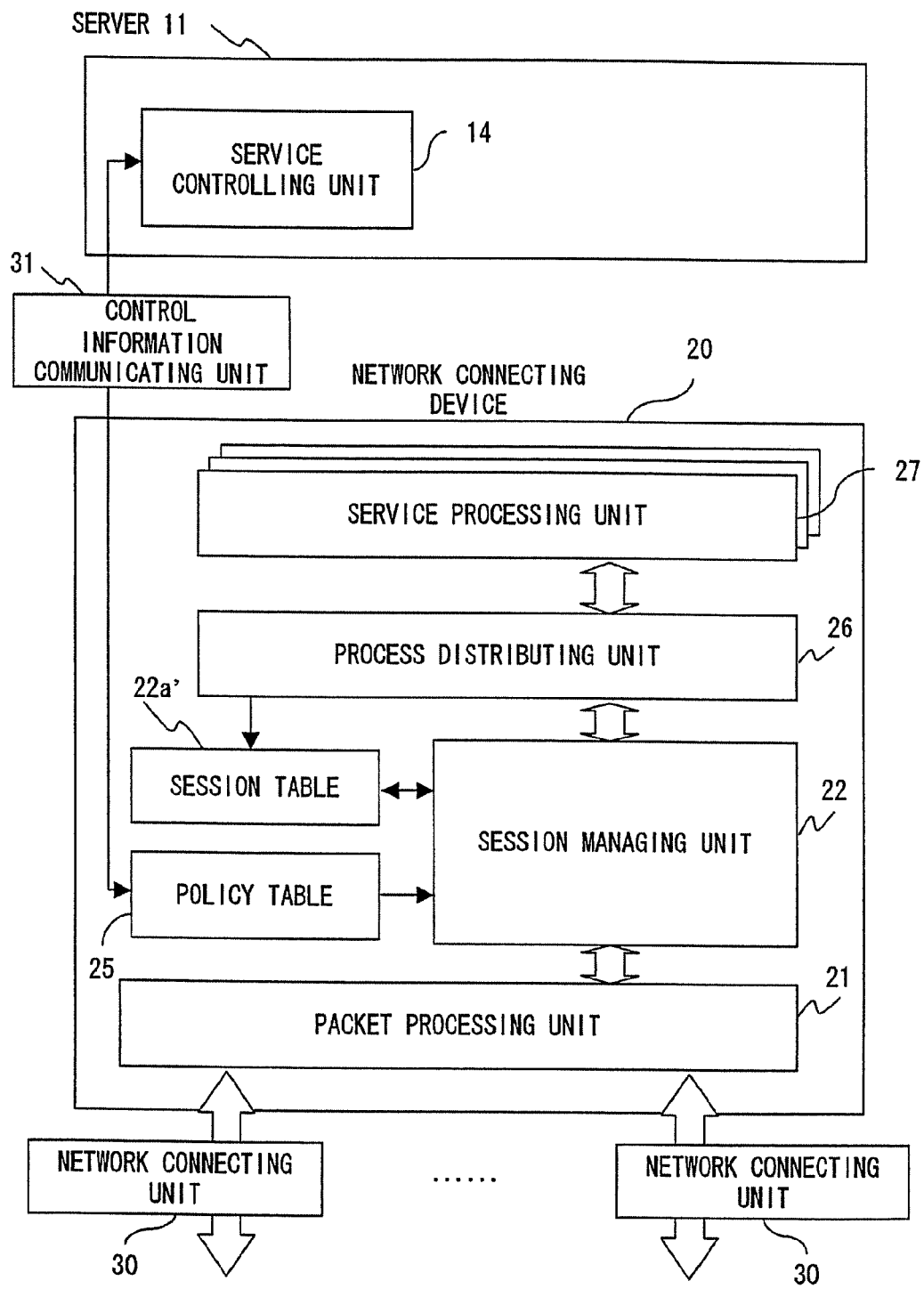
FIG. 13 shows the configuration of a packet relay processing apparatus according to a third preferred embodiment of the present invention.

FIG. 13 shows the configuration of a packet relay processing apparatus according to a third preferred embodiment of the present invention. According to this preferred embodiment, a process distributing unit 26, service processing units 27, and a policy table 25 are arranged in the network connecting device 20. With this configuration, the network connecting device 20 performs service processes such as filtering, load balancing, NAT, etc. according to a policy set in the policy table 20 by the server 11.

As shown in this figure, a server 11 comprises a service controlling unit 14. The service controlling unit 14 writes a policy to the policy table 25 within the network connecting device 20 via a control information communicating unit 31. Here, a policy is a rule for applying a service such as filtering, load balancing, etc. By way of example, for the filtering, whether to discard or to pass a packet in the range of a policy search key is set based on a policy. For the load balancing, a virtual (representative) IP address and port number, and IP addresses and port numbers of servers at all of distribution destinations are set based on a policy. For the NAT, IP address and port number after being translated are set based on a policy.

The network connecting device 20 according to this preferred embodiment comprises a packet processing unit 21, a session managing unit 22, and a session table 22a', similar to the first preferred embodiment. The network connecting device 20 further comprises the above described policy table 25, process distributing unit 26, and service processing units 27. The plurality of service processing units 27 are arranged to support the types of services applied to a packet.

According to this preferred embodiment, upon receipt of a packet, the session managing unit 22 searches the session table 22a' for session data by using the information within the header of the received packet. If the session data indicated by the information within the header of the packet is registered to the session table 22a', a process that is almost similar to the above described one is performed.

If the session data indicated by the information within the header of the packet is not registered to the session table 22a', the session managing unit 22 references the policy table 25, generates session data based on a policy to be applied to the packet, and stores the generated session data in the session table 22a'.

The process distributing unit 26 determines a service to be applied to the packet based on the session data stored in the session table 22a', and distributes the packet to the service processing unit 27 corresponding to the determined service. The plurality of service processing units 27 respectively perform processes required for services.

The session table 22a' and the policy table 25 according to this preferred embodiment are described below with reference to FIGS. 14 and 15. FIG. 14 exemplifies the structure of the session table 22a' according to this preferred embodiment. The session table 22a' is a table storing session data for managing a session as described above. Session data includes as entries a session ID, a session search key (destination and source addresses and ports, a protocol, etc.), a session state, an output destination, etc. In this preferred embodiment, session data further includes as entries an applied service type (filtering, load balancing, etc.), and service-specific information (a distribution destination address, etc.), consistency duration, an event flag, etc. in addition to the above described information entries. The applied service type indicates a service to be applied to a packet. The service-specific information indicates information specific to a service to be applied. For example, if the applied service type is load balancing, an address of a distribution destination is considered as the service-specific information. The consistency duration indicates a time period during which session data is held from the termination of a session. Namely, session data is not deleted from the session table 22a' despite the termination of a session until the consistency duration elapses. The event flag indicates whether or not to record a log of a packet or the header of a packet. If the event flag is ON, a packet or the header of a packet is transferred to the server 11, which records the log of the packet or the header of the packet.

FIG. 15 exemplifies the configuration of the policy table. The policy table stores a policy, which is a rule for applying a service to a packet. As shown in this figure, a policy includes a policy ID, a policy search key, an applied service type, service-specific information, priority, a group ID, an event flag, consistency duration, and the number of policy hits.

The policy ID is information for identifying a policy. The policy search key is information for determining a policy to be applied to a packet. The applied service type is a service applied to a packet based on a policy. The service-specific information is information specific to an applied service, similar to session data. The priority is a numeric value indicating the priority of a policy. The smaller the value of a priority, the more the corresponding policy is prioritized. The priority is used to determine which of policies is prioritized, when information within the header of a packet hits the policy search keys of the policies. The group ID is information for identifying a group to which a policy belongs. The event flag and the consistency duration are similar to those of session data. The number of policy hits stores the count value of sessions that hit the policy.

Processes using the event flag, the consistency duration, the group ID, and the number of policy hits will be described later as examples of modifications.

The operations of the packet relay processing apparatus according to the third preferred embodiment, which is shown in FIG. 13, are explained below with reference to FIGS. 16 to 20.

In the packer relay processing apparatus shown in FIG. 13, a packet input from the network first passes through the network connecting unit 30, and is transmitted to the packet processing unit 21.

After the packet processing unit 21 buffers the input packet, calculates a checksum, and defragments the packet, it transmits the packet to the session managing unit 22. Then, the packet processing unit 21 fragments the packet returned from the session managing unit 22, recalculates a checksum, and outputs the packet to the network via the network connecting unit 30.

Figure 16:
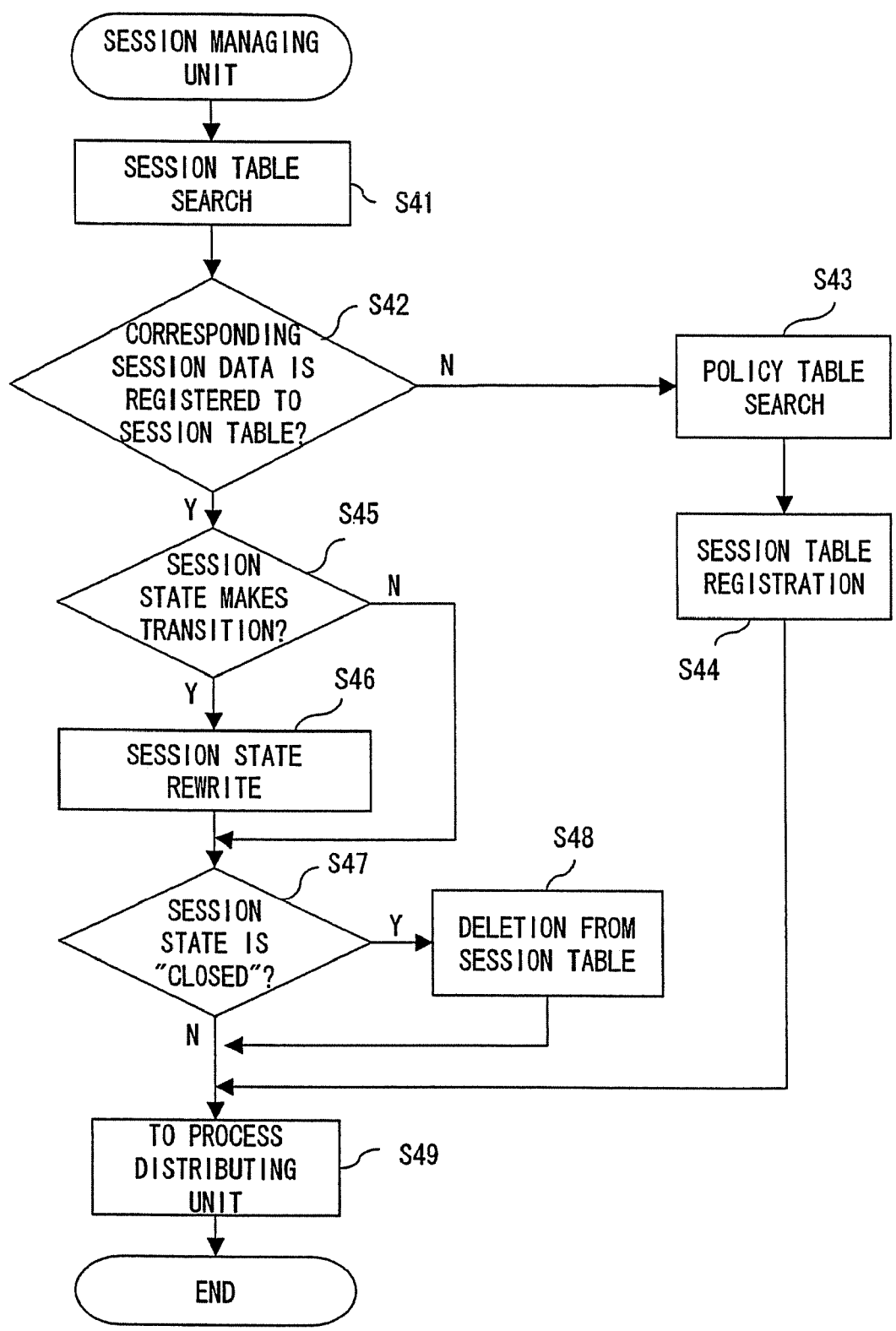
FIG. 16 is a flowchart showing the process performed by a session managing unit according to the third preferred embodiment.

FIG. 16 is a flowchart showing the process performed by the session managing unit 22 according to this preferred embodiment.

As shown in this figure, when a packet is input to the session managing unit 22, the session managing unit 22 searches the session table 22a' shown in FIG. 14 for corresponding session data by using the information within the header of the packet (step S41).

In a similar manner as in the first preferred embodiment, the session table is searched by using as a session search key information such as source and destination IP addresses within an IP header of the packet, and a protocol and source and destination ports within a TCP header.

If corresponding session data whose session search key matches the information within the header of the packet is not registered to the session table 22a' ("NO" in step S42), this packet is the initial packet of a session. The session managing unit 22 therefore searches the policy table 25 shown in FIG. 15 for a policy by using the information within the header of the packet in order to determine a service to be applied to the session (step S43).

The policy table 25 stores a policy search key (destination and source addresses and ports, a protocol, etc. An arbitrary or a range specification may be made), an applied service type (filtering and discarding, load balancing, etc.), service-specific information (all of distribution destination addresses, etc.), and a priority in addition to routing information.

If a policy of the policy table 25 matches the information within the header of the packet as a result of the search, this policy is written to the applied service type entry of the session table 22a'. That is, the session managing unit 22 obtains from the policy table 25 the policy having the policy search key that matches the information stored in the header of the packet. Then, the session managing unit 22 generates session data whose session search key is based on the information within the header of the packet, and registers the generated session data to the session table 22a'. Besides, the session managing unit 22 respectively writes the applied service type and the service-specific information, which are included in the policy, to the applied service type and the service-specific information entries of the registered session data (step S44).

If the information within the header of the packet matches a plurality of policies, the policies are processed in descending order of priorities within the policy table 25. If the information within the header of the packet matches a plurality of identical services, the service having the highest priority is adopted, and the remaining services are invalidated.

Next, the process performed when a plurality of policies, which include policy search keys that match information stored in the header of a packet, exist at the time of searching the policy table 25 is explained more specifically.

If applied service types included in the plurality of obtained policies do not conflict with one another, the session managing unit 22 writes the applied service types to the applied service type entry of the session data in ascending order of the values of the priorities of the policies (namely, in descending order of the priorities). As a result, the plurality of services are applied to the packet belonging to the session in descending order of the priorities.

If the applied service types included in the plurality of obtained policies conflict with one another, the session managing unit 22 writes only the applied service type of the policy having the smallest priority value among the policies to the applied service type entry of the session data. As a result, only the service having the highest priority is applied to the packet.

Next, explanation is provided by taking a specific example. Here, assume that the following six policies are obtained as policies having policy search keys that match information stored in the header of a packet.

policy 1: applied service=filtering and passing priority value=10
policy 2: applied service=filtering and passing priority value=100
policy 3: applied service=filtering and passing priority value=200
policy 4: applied service=load balancing priority value=1000
policy 5: applied service=load balancing priority value=2000
policy 6: applied service=load balancing priority value=3000

In this case, the filtering and passing, and the load balancing are applied service types that do not conflict with each other. Additionally, since all of the applied service types of the policies 1 through 3 are filtering and passing, they conflict with one another. Similarly, all of the applied service types of the policies 4 through 6 are the load balancing, they also conflict with one another. The session managing unit 22 adopts the policy 1 having the smallest priority value among the policies whose applied service types are the filtering and passing, and the policy 4 having the smallest priority value among the policies whose applied service types are the load balancing. Then, the session managing unit 22 writes the filtering and passing, and the load balancing in this order to the applied service type entry of the session data, because the priority value of the policy 1 is smaller than that of the policy 4. As a result, the load balancing service is applied to the packet after the filtering and passing.

The process for the state transition of a session in steps S45 to S48, which is performed when the result of the search is "YES" in step S42, is similar to that explained in the first preferred embodiment. Namely, if corresponding session data is registered to the session table 22a', the session managing unit 22 monitors the session state of the session table 22a', and determines whether or not the state makes a transition (step S45). If the session state makes a transition ("YES" in step S45), the session managing unit 22 rewrites the session state of the session table 22a' (step S46). After the state transition of the session terminates, the session managing unit 22 deletes the session data of this session from the session table 22a' (step S48). The processed packet is then transmitted to the process distributing unit 26 (step S49).

Figure 17:
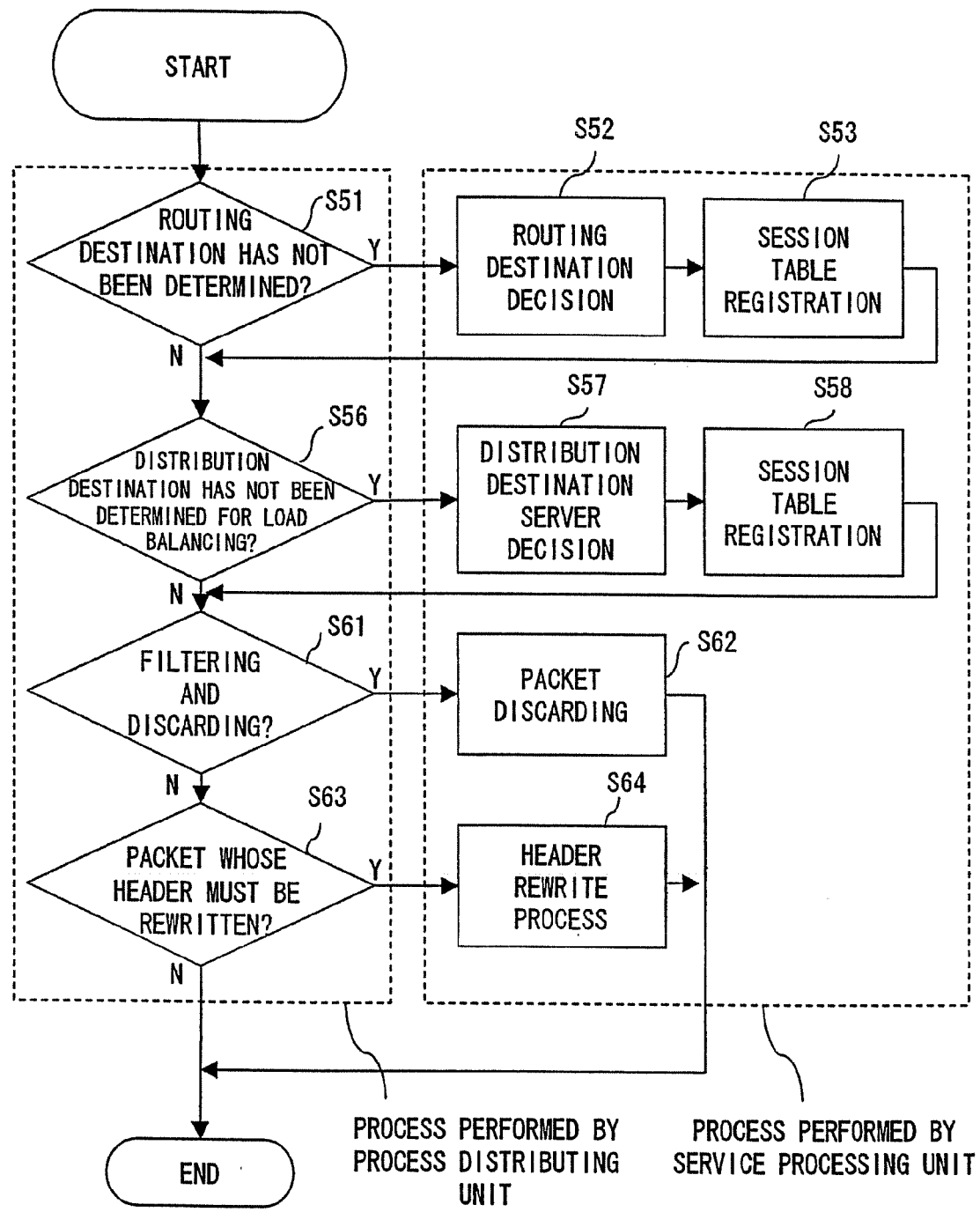
FIG. 17 is a flowchart showing the processes performed by a process distributing unit and a service processing unit according to the third preferred embodiment.

FIG. 17 is a flowchart showing the processes performed by the process distributing unit 26 and the service processing unit 27.

The process distributing unit 26 and the service processing unit 27 determine a service to be applied to a packet, and performs processes required for each service.

In FIG. 17, when a packet is input to the process distributing unit 26, the process distributing unit 26 searches the session table 22a' for session data corresponding to the input packet by using the information within the header of the packet. If the applied service type indicated by the session data which is obtained as a result of the search is a routing process (step S51), the process distributing unit 26 distributes the packet to the service processing unit 27 which performs the routing process.

If a routing destination is not registered to the entry of the session data, which corresponds to the input packet, a routing table is referenced, and an output destination interface and a destination MAC address are written to the session table 22a'.

To be more specific, the process distributing unit 26 determines whether or not the session data includes the routing destination (step S51). If the session data does not include the routing destination ("YES" in step S51), the service processing unit 27 to which the packet is distributed searches the routing table (not shown in FIG. 13) by using the destination IP address included in the session data, determines the output destination interface and the destination MAC address, which are obtained as a result of the search, as the routing destination (step S52), and writes the determined routing destination to the session data (step S53). Thereafter, packets of the session corresponding to the session data are transferred to the determined routing destination. Then, the process of the service processing unit 26 proceeds to step S56.

If the process distributing unit 26 determines that the input packet is a packet to which the load balancing service is to be applied, and the session data does not include a distribution destination server, namely, the distribution destination server has not been determined at the time of referencing the applied service type entry of the session data that is obtained as a result of searching the session table 22a' ("YES" in step S56), the process distributing unit 26 distributes the packet to the service processing unit 27 that performs the load balancing process. The service processing unit 27 to which the packet is distributed determines the distribution destination server (step S57), and writes the address of the determined distribution destination to the corresponding service-specific information entry of the session table 22a' (step S58). The process then proceeds to step S61.

If the process distributing unit 26 determines that the input packet is a packet to which a filtering and discarding service is to be applied at the time of referencing the applied service type entry of the session data that is obtained as a result of searching the session table 22a' ("YES" in step S61), the process distributing unit 26 distributes the packet to the service processing unit 27 which performs the packet discarding process. The service processing unit 27 to which the packet is distributed discards the packet (step S62), and terminates the process. If the result of the determination made in step S61 is "NO", the process proceeds to step S63.

If the process distributing unit 26 determines that the input packet is a packet to which a load balancing or a NAT service is to be applied at the time of referencing the applied service type entry of the session data that is obtained as a result of searching the session table 22a', it determines that the input packet is a packet whose header must be rewritten ("YES" in step S63). The process distributing unit 26 distributes the packet to the service processing unit 27 which performs the header rewrite process. The service processing unit 27 to which the packet is distributed rewrites the source/destination IP address, the source/destination port, etc. within the IP header and the TCP header of the packet according to the session data stored in the session table 22a' (step S64), and terminates the process. If a plurality of applied services are stored in session data, they are applied to an input packet in an order where they are stored.

As described above, according to this preferred embodiment, the CPU use ratio of the server 11 can be reduced in a similar manner as in the first preferred embodiment, and the consistency of a session currently being continued can be maintained even if a routing table is changed during the session.

Additionally, a process distributing unit 26 and a plurality of service processing units 27, which support a plurality of services, are arranged in the network connecting device 20 that can perform a process faster than the server 11. Consequently, the CPU use ratio of the server 11 can be reduced, and at the same time, a service process can be performed faster.

Furthermore, according to this preferred embodiment, a plurality of service processing units 27 are arranged in the network connecting device 20 depending on services. As a result, a new service processing unit 27 which supports a necessary service is added to the network connecting device 20 if the new service becomes necessary, whereby flexible configuration that can support a new service is easily implemented. For example, if VPN (Virtual Private Network) encryption and decryption services become necessary, service processing units 27 that respectively apply VPN encryption and decryption services are newly added, thereby coping with an addition of a new service.

Figure 18:
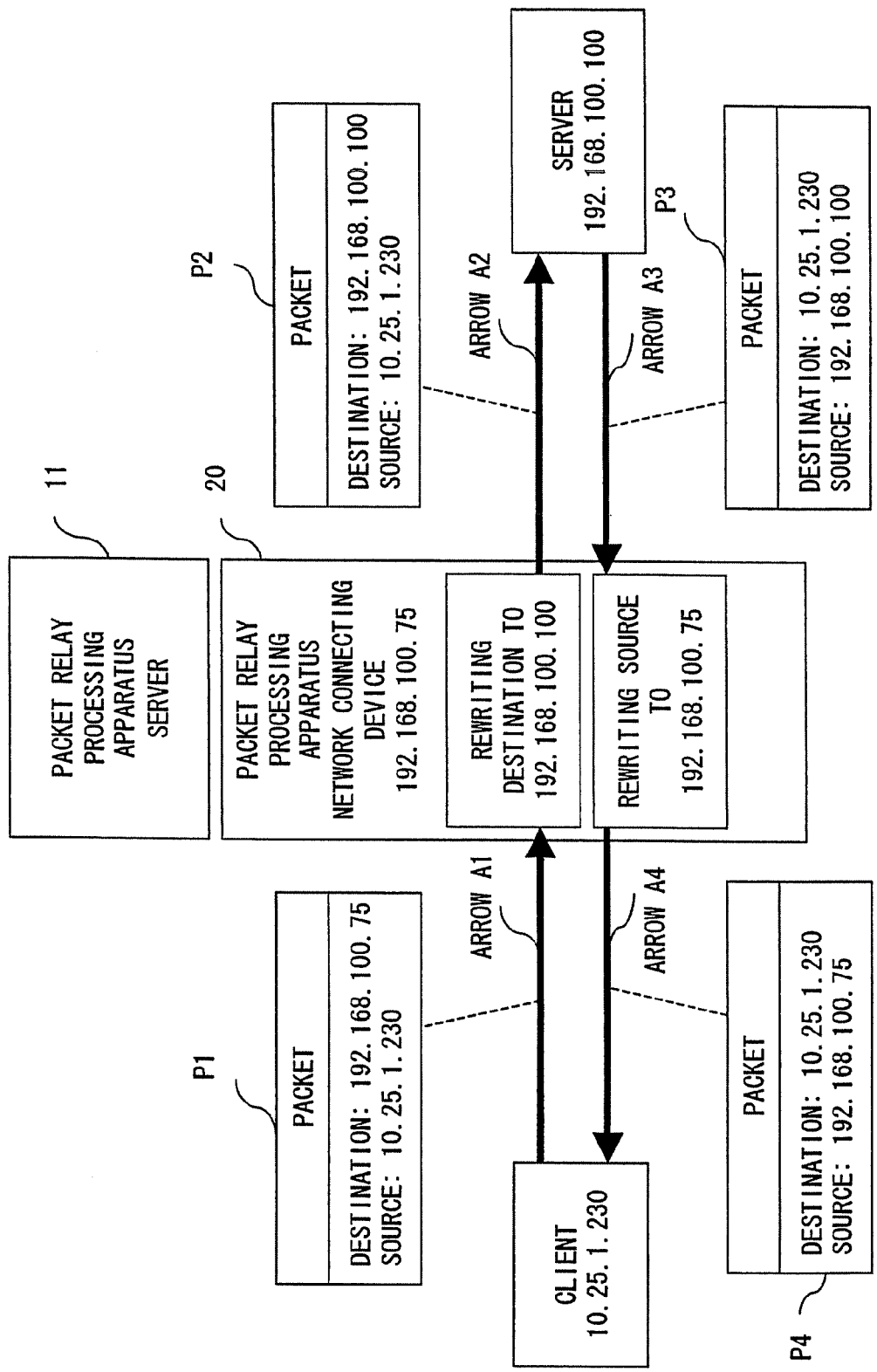
FIG. 18 shows the packet flow in a load balancing service after a policy search is terminated in the third preferred embodiment.

The header rewrite process is described in further detail below with reference to FIG. 18. This figure shows the packet flow in the case where the network connecting device 20 applies a load balancing service in this preferred embodiment. Note that the packet flow shown in FIG. 18 corresponds to the session data whose session IDs are 2 and 3 within the session table 22a' shown in FIG. 14. Additionally, the orientations of arrows indicate the directions where a packet is transmitted.

When a packet is transmitted from a client having an address 10.25.1.230 to a server having an address 192.168.100.75, a packet P1 whose header stores "destination address: 192.168.100.75, source address: 10.25.1.230" is first transmitted from the client to the network connecting device 20 as indicated by an arrow A1. The session managing unit 22 within the network connecting device 20 searches the session table 22a' shown in FIG. 14 by using as a session search key the source address 10.25.1.230, the destination address 192.168.100.75, etc., which are included in the packet P1, and obtains the session data whose session ID is 3.

Since the applied service type within the obtained session data is "header rewrite", the process distributing unit 26 within the network connecting device 20 distributes the packet to the service processing unit 27 which performs the header rewrite process. Since service-specific information within the session data is "destination address: 192.168.100.100", the service processing unit 27 to which the packet is distributed rewrites the destination address within the packet P1 from "192.168.100.75" to "192.168.100.100". As a result, a packet P2 whose header stores "destination address: 192.168.100.100, source address: 10.25.1.230" is transmitted from the network connecting device 20 to the distribution destination server having the address 192.168.100.100 as indicated by an arrow A2.

Inversely, if a packet is transmitted from the distribution destination server having the address 192.168.100.100 to the client having the address 10.25.1.230, a packet P3 whose header stores "destination address: 10.25.1.230, source address: 192.168.100.100" is first transmitted from the distribution destination server to the network connecting device 20 as indicated by an arrow A3. The session managing unit 22 within the network connecting device 20 seaches the session table 22a' shown in FIG. 14 by using as a session search key the source and the destination addresses included in the packet P3, and obtains the session data whose session ID is 2.

Because the applied service type entry within the obtained data indicates "header rewrite", the process distributing unit 26 within the network connecting device 20 distributes the packet to the service processing unit 27 which performs the header rewrite process. The service processing unit 27 to which the packet is distributed rewrites the source address within the packet from "192.168.100.100" to "192.168.100.75" based on service-specific information within the session data. As a result, a packet P4 whose header stores "destination address: 10.25.1.230, source address: 192.168.100.75" is transmitted from the network connecting device 20 to the client having the address 10.25.1.230. In this way, the network connecting device 20 can distribute the load on a destination server included in a packet by rewriting the header of the packet.

Figure 19:
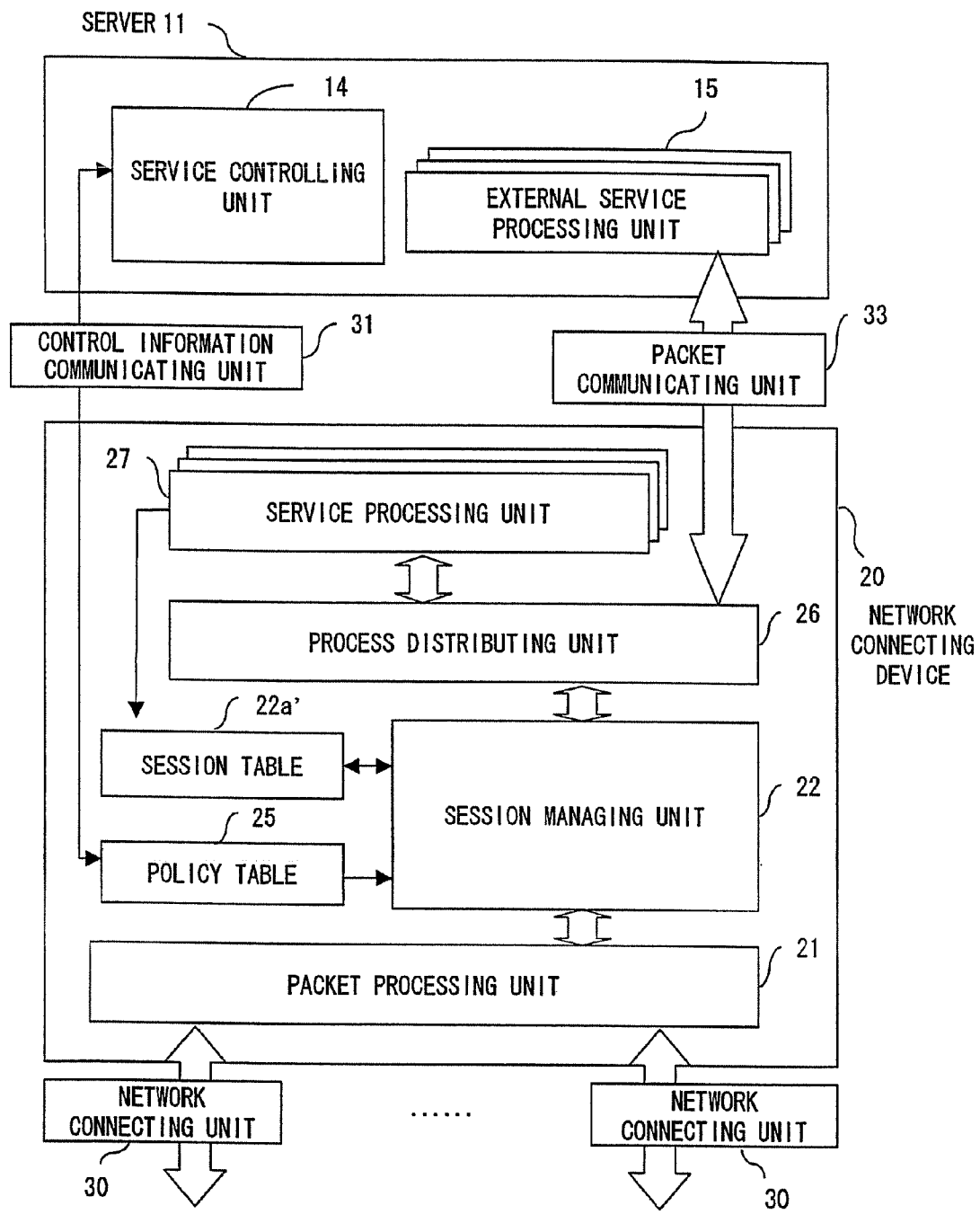
FIG. 19 shows the configuration of a packet relay processing apparatus according to a fourth preferred embodiment of the present invention.

FIG. 19 shows the configuration of a packet relay processing apparatus according to a fourth preferred embodiment of the present invention. According to this preferred embodiment, a server transfer capability is arranged in the process distributing unit 26, and an external service processing unit 15 is arranged in the server 11 in the above described packet relay processing apparatus according to the third preferred embodiment, so that a service process can be performed by both the network connecting device 20 and the server 11. If a service process is performed by the server 11 in this preferred embodiment, not only the contents of the service, but also a transfer to the server 11 is set in the policy in the policy table 25. The other operations are similar to those in the third preferred embodiment.

As shown in FIG. 19, a plurality of external service processing units 15 can be arranged in the server 11 depending on applied service types, similar to the service processing units 27 according to the third preferred embodiment. Therefore, similar to the service processing units 27 according to the third preferred embodiment, a new external service processing unit 15 which supports a new service type is added to the server 11 if the new service type becomes necessary, thereby easily coping with an addition of a new service.

Since the configurations of the session table 22a' and the policy table 25 according to this preferred embodiment are almost similar to those in the third preferred embodiment, detailed explanations are omitted. A difference is that a transfer to the server 11, and the contents of a service applied by the external service processing unit 15, can be set in the session table 22a' and the policy table 25 in addition to the contents of a service applied by the service processing unit 27, according to the fourth preferred embodiment.

Figure 20:
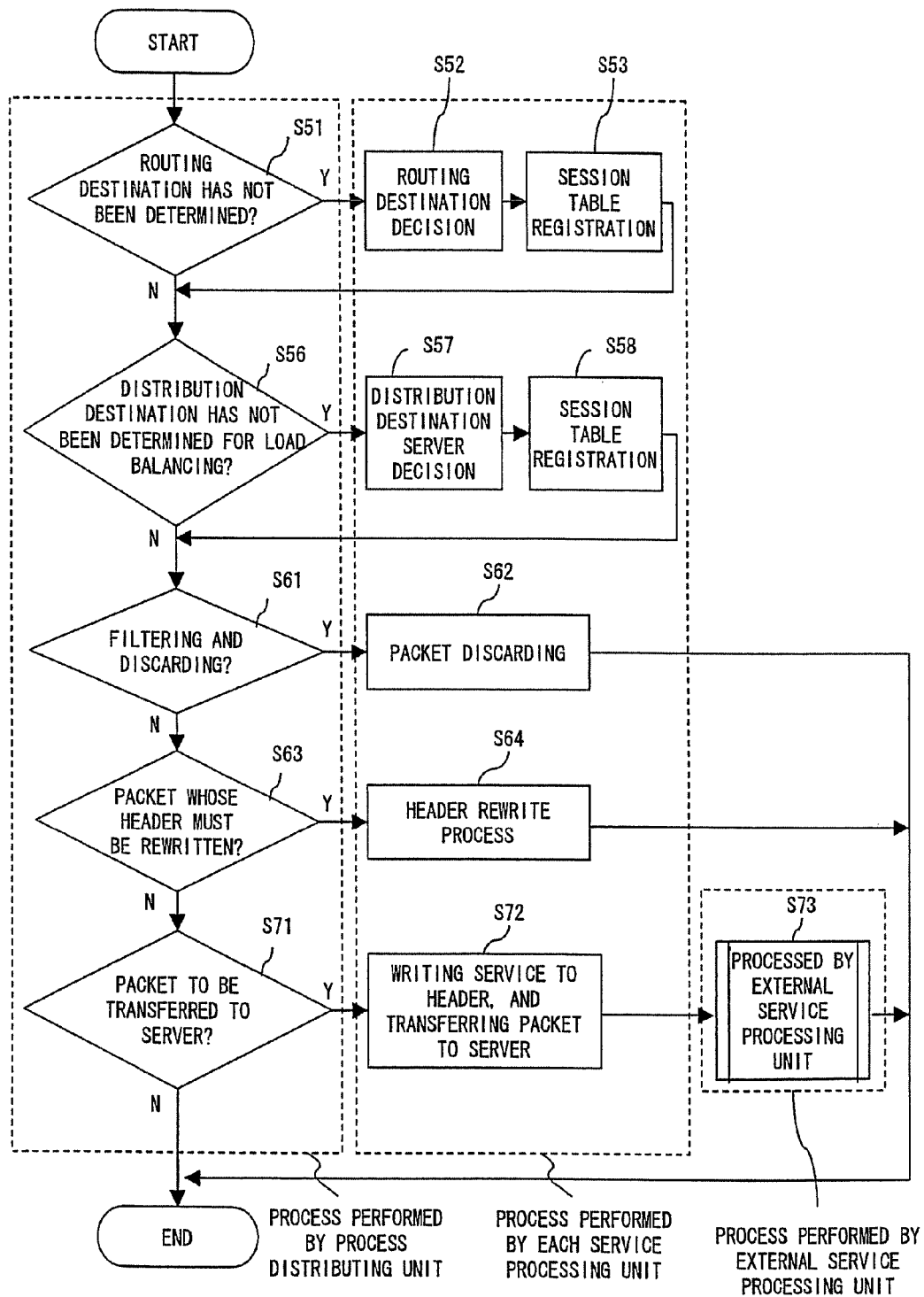
FIG. 20 is a flowchart showing the processes performed by a process distributing unit, a service processing unit, and an external service processing unit according to the fourth preferred embodiment.

FIG. 20 is a flowchart showing the processes performed by the process distributing unit 26, the service processing unit 27, and the external service processing unit 15. In this figure, operations in steps S51 to S64 are the same as those in FIG. 17. By way of example, if "routing" is written to the applied service type entry, and a routing destination is not written in the session data corresponding to an input packet within the session table 22a', the service processing unit 27 references the routing table within the policy table 25, and writes an output destination interface and a destination MAC address to the session data within the session table 22a'.

As described above, if a "server transfer" is not set in the applied service type entry when referencing the applied service type within the session table 22a', a process according to the applied service type is performed, and a header rewrite process is performed if a packet requires the header rewrite as explained with reference to FIG. 17.

Additionally, according to this preferred embodiment, some of service processes are performed by the external service processing unit 15 within the server 11. To implement this, the process distributing unit 26 performs the following operations in addition to the operations in steps S51 to S64 of FIG. 17.

Namely, the process distributing unit 26 references the applied service type entry of session data that is obtained as a result of searching the session table 22a', and determines whether or not an input packet is a packet to be transferred to the server 11 (step S71). If "server transfer: ON" and an applied service type are set in the applied service type entry of the session data ("YES" in step S71), the process distributing unit 26 distributes the packet to the service processing unit 27 which performs the process for attaching a header for a transfer. The service processing unit 27 to which the packet is distributed attaches the header for a transfer to the packet. Contents of the header for a transfer include, for example, an applied service type, a session ID, and an input interface of session data corresponding to a packet. Next, the service processing unit 27 transfers the packet to the external service processing unit 15 within the server 11 via the packet communicating unit 33 (step S72). The external service processing unit 15 which supports the applied service type processes the received packet (step S73).

The process flow of the external service processing unit 15 is similar to that shown in FIG. 17. For example, if a routing destination has not been determined yet within the session data, the external service processing unit 15 determines the routing destination, and writes an output destination interface and a destination MAC address to the session table 22a'.

If an input packet is a packet to which a load balancing service is to be applied and its distribution destination has not been determined yet within the session data, the external service processing unit 15 determines a distribution destination server, and writes the determined distribution destination sever to the service-specific information entry of corresponding session data within the session table 22a' If the input packet is a packet to which a filtering and discarding service is to be applied, the external service processing unit 15 discards the packet.

Or, if the input packet is a packet to which a load balancing or a NAT service is to be applied, the external service processing unit 15 rewrites the source/destination IP address, the source/destination port, etc. within the IP and the TCP headers of the packet according to the session data within the session table 22a'.

The above provided explanation refers to the case where the external service processing unit 15 applies the same service as that applied by the network connecting device 20. However, the external service processing unit 15 may perform service processes such as encryption, decryption, a proxy process, contents translation, protocol conversion, etc., which are not performed by the network connecting device 20.

As described above, according to this preferred embodiment, the packet relay processing capability based on session management is arranged in the network connecting device 20, so that the capability that is conventionally arranged in a server is implemented by the network connecting device 20. Consequently, the CPU use ratio of the server 11 can be reduced in a similar manner as in the first preferred embodiment. Additionally, similar to the first preferred embodiment, the consistency of a session currently being continued can be maintained, even if a routing table is changed during the session. Furthermore, the capability for transferring a packet to the server is arranged in the process distributing unit 26, and the external service processing unit 15 is arranged in the server 11, so that a service process can be performed by both the network connecting device 20 and the server 11. As a result, a service process that is difficult to be implemented by the network connecting device 20 can be performed by the server 11, thereby coping with also the case where a network service requires a complex process.

Figure 21:
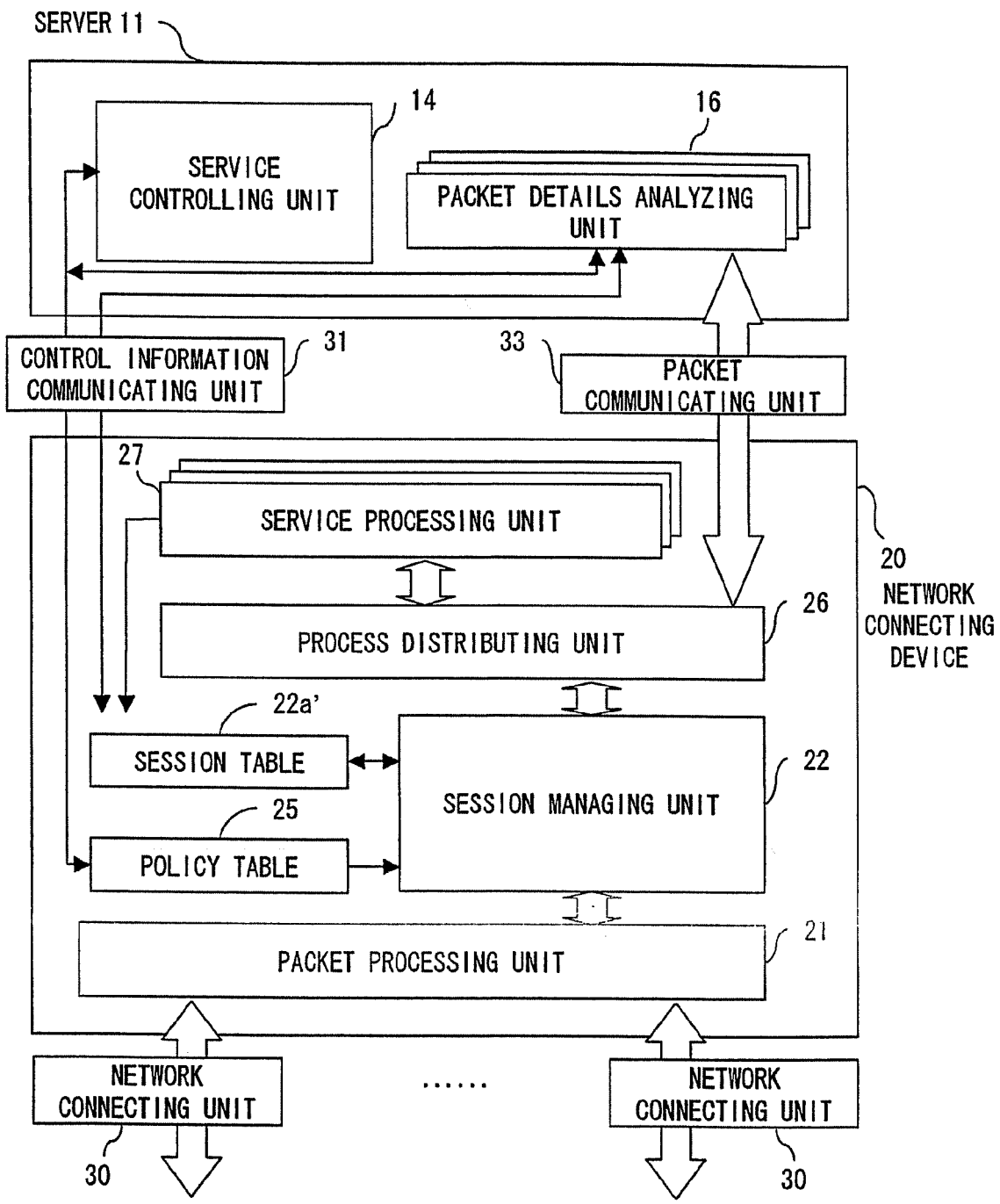
FIG. 21 shows the configuration of a packet relay processing apparatus according to a fifth preferred embodiment of the present invention.

A fifth preferred embodiment is described next. FIG. 21 shows the configuration of a packer relay processing apparatus according to the fifth preferred embodiment of the present invention. As shown in FIG. 21, the packet relay processing apparatus according to this preferred embodiment further comprises a packet details analyzing unit 16 in the server 11 that configures the packet relay processing apparatus according to the third preferred embodiment. With this configuration, a process distributing unit 26 within a network connecting device 20 transfers a packet to the server 11 depending on a given condition, and the packet details analyzing unit 16 within the server 11 analyzes the packet, determines a service, and sets the contents of the determined service in the network connecting device 20. Once the contents of the determined service are set, the network connecting device 20 performs a relay process based on the contents of the determined service for the same session.

In FIG. 21, the server 11 comprises a service controlling unit 14 in a similar manner as in the third and the fourth preferred embodiments. The service controlling unit 14 writes a policy to the policy table 25 within the network connecting device 20 via the control information communicating unit 31 as described above. The service controlling unit 14 also writes a policy to a policy table for details analysis (not shown in FIG. 21) that the server 11 comprises.

The server 11 further comprises the packet details analyzing unit 16. The packet details analyzing unit 16 analyzes a packet and determines a service for a session including the packet based on the session table for details analysis and the policy table for details analysis, which are not shown, and resets session data stored within the session table 22a' of the network connecting device 20 based on the contents of the determined service. After the session data is reset, the network connecting device 20 performs a relay process based on the contents of the service set in the session data. Data configurations of the session table for details analysis and the policy table for details analysis will be described later.

Similar to the service processing units 27 and the external service processing units 15 in the third and the fourth preferred embodiments, a plurality of packet details analyzing units 16 can be arranged in the server 11 depending on applied service types. Accordingly, a new packet details analyzing unit 16 which supports a new service type is added to the server 11 if the new service type becomes necessary, thereby easily coping with an addition of a new service.

The network connecting device 20 according to this preferred embodiment comprises a packet processing unit 21, a session managing unit 22, a session table 22a', a policy table 25, a process distributing unit 26, and service processing units 27, similar to the network connecting device 20 according to the third preferred embodiment. Furthermore, the process distributing unit 26 comprises the capability for transferring a packet to the server.

The processes performed by the packet processing unit 21, the session managing unit 22, the process distributing unit 26, and the service processing unit 27 are similar to those in the third preferred embodiment. Since the data configuration of the policy table 25 according to this preferred embodiment is similar to that in the third preferred embodiment, its explanation is omitted here. The data configuration of the session table 22a' according to this preferred embodiment will be described later.

Furthermore, in this preferred embodiment, a range in which a service is to be applied to a packet transferred to the packet details analyzing unit 16 (for example, http indicates a range of a packet to which a URL filtering service is to be applied) is preset by the server 11 in the applied service type entry within the policy table 25. The process distributing unit 26 determines a packet to be transferred to the server 11 by referencing the policy table 25 in a similar manner as in the fourth preferred embodiment, attaches information indicating an applied service type to the header of the packet, and transfers the packet to the packet details analyzing unit 16 within the server 11 is via the packet communicating unit 33.

The data configurations of the tables according to this preferred embodiment are described below with reference to FIGS. 22 to 27. Firstly, the session table 22a' according to this preferred embodiment is explained with reference to FIGS. 22 to 25. As shown in FIGS. 22 to 25, entries included in session data stored in the session table 22a' are similar to those in the session table 22a' shown in FIG. 14. According to this preferred embodiment, however, after session data is registered to the session table 22a', the packet details analyzing unit 16 analyzes a packet, and resets the session data within the session table 22a' based on an analysis result.

FIGS. 22 and 23 exemplify the session table 22a' when the session managing unit 22 registers session data based on the policy table 25. As shown in these figures, "server transfer: ON" is stored in the applied service type entry of each session data, since the packet details analyzing unit 16 has not yet made an analysis. Accordingly, a packet of a session corresponding to each session data is transferred to the server 11.

FIGS. 24 and 25 exemplify the session table 22a' after the packet details analyzing unit 16 resets session data based on an analysis result of a packet. As shown in these figures, "server transfer: OFF" is stored in the applied service type entry of each session data, since the packet details analyzing unit 16 has made an analysis. Accordingly, a packet of a session corresponding to each session data is not transferred to the server 11 thereafter.

Since the session data has been reset by the packet details analyzing unit 16, the following differences further exist between the session table 22a' shown in FIGS. 22 and 23 and that shown in FIGS. 24 and 25.

As shown in FIGS. 22, "URL filtering" is stored in the applied service type entry of session data whose session IDs are 0 and 1. In the meantime, "filtering and passing" is stored in the same entry of the session data whose session IDs are the same, which are shown in FIG. 24, since it has been determined that a packet is made to pass through as a result of the analysis of the packet, which is made by the packet details analyzing unit 16.

As shown in FIG. 22, "URL load balancing" is stored in the applied service type entry of session data whose session IDs are 2 to 5, but information about a distribution destination server is not stored in the service-specific information entry. In the meantime, since a distribution destination server has been determined as a result of the analysis of the packet, which is made by the packet details analyzing unit 16, the session data whose session IDs are 3 and 4 are deleted, "header rewrite" is stored in the applied service type entry of the session data whose session IDs are 2 and 5, and the information about the distribution destination server is stored in the service-specific information entry as shown in FIG. 24.

As shown in FIG. 23, "FTP (File Transfer Protocol) filtering" is stored in the applied service type entry of session data whose session IDs are 6 and 7. Thereafter, it has been determined that the packet of each of the sessions is made to pass through as a result of the analysis of the packet, which is made by the packet details analyzing unit 16. Accordingly, session data for data connections, whose session IDs are 8 and 9, are newly registered in addition to the session data for control connections, whose session IDs are 6 and 7, and "filtering and passing" is stored in the applied service type entry of the session data having the session IDs 8 and 9, as shown in FIG. 25.

Next, the tables comprised by the packet details analyzing unit 16 are described with reference to FIGS. 26 and 27. The packet details analyzing unit 16 comprises a session table for details analysis, and a policy table for details analysis in order to analyze a packet.

FIG. 26 exemplifies the session table for details analysis. The session table for details analysis, which is shown in FIG. 26, corresponds to the session table 22a' shown in FIGS. 22 and 23. As shown in FIG. 26, session data stored in the session table for details analysis includes as entries a session ID, a session search key, a session state, an associated session, and an applied service type. The entries except for the associated session are similar to those of the session data stored in the session table 22a'. The associated session is a session ID of a session that is determined to be associated as a result of a packet analysis made by the packet details analyzing unit 16. Session data within the session table for details analysis is registered by the packet details analyzing unit 16 at the time of a details analysis based on the session data stored in the session table 22a', and deleted by the packet details analyzing unit 16 upon termination of the details analysis.

FIG. 27 exemplifies the configuration of the policy table for details analysis. The policy table for details analysis, which is shown in FIG. 27, stores a policy that includes further details than those in the policy table 25 shown in FIG. 15. By way of example, for the URL filtering, a table for URL filtering, which indicates whether to pass or to discard a packet for each URL, is arranged in the policy table for details analysis. Additionally, for the FTP filtering, a table for FTP filtering, which indicates whether a packet is either passed or discarded for each IP address and port number, is arranged. Furthermore, for the URL load balancing, a table for URL load balancing, which indicates an IP address being a candidate of a distribution destination server, and a distribution method, etc. for each URL, is arranged. Note that the session table for details analysis, which is shown in FIG. 26, corresponds to the session table 22a' shown in FIGS. 22 to 25.

Figure 28:
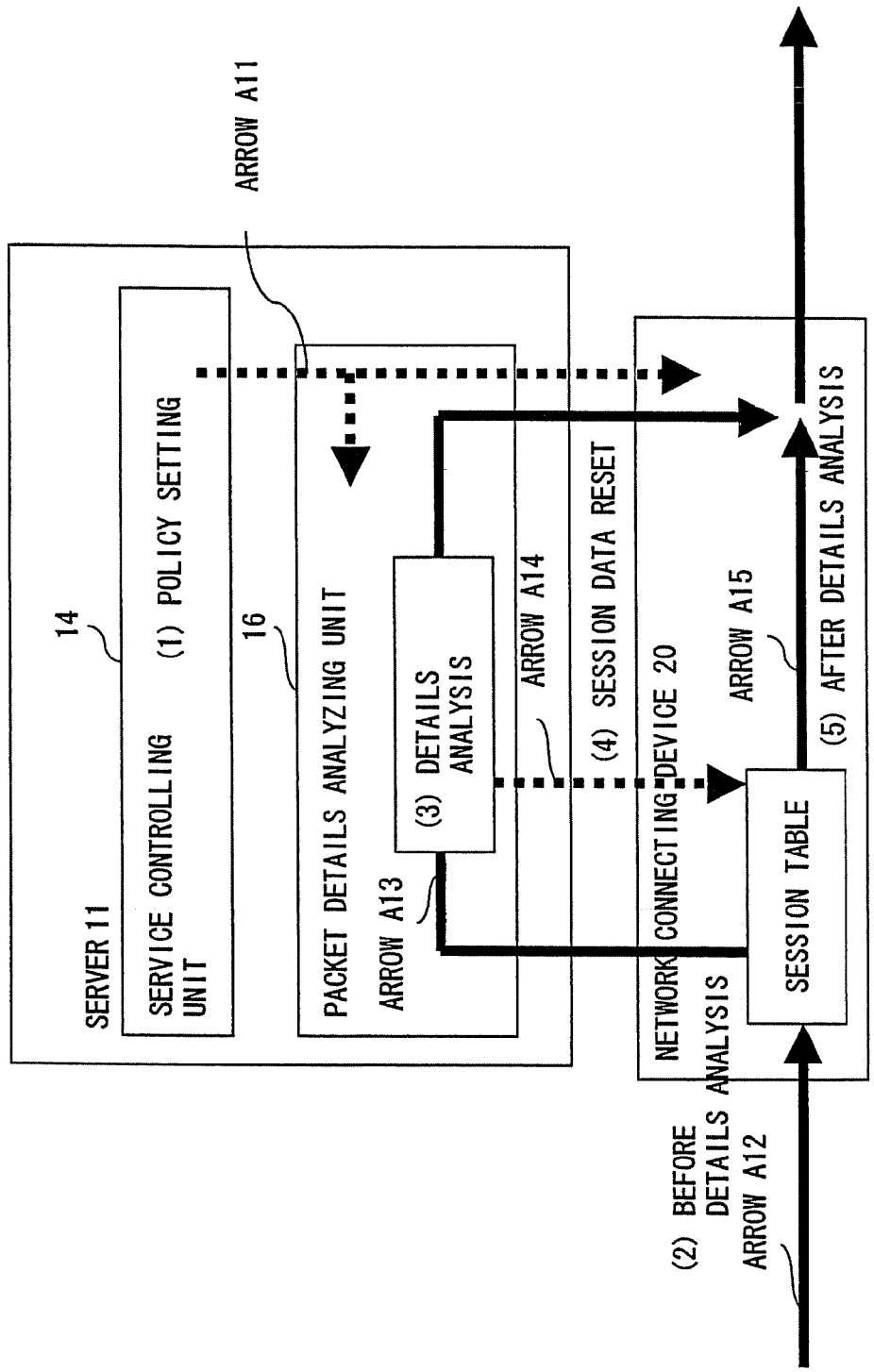
FIG. 28 shows the concept of operations of the packet relay processing apparatus according to the fifth preferred embodiment.

The concept of the operations of the packet relay processing apparatus according to the fifth preferred embodiment is described below with reference to FIG. 28. In this figure, solid line arrows indicate the directions where a packet proceeds, whereas broken line arrows indicate data read/write operations from/to the tables.

Firstly, the service controlling unit 14 within the server 11 writes a policy to the policy table 25 within the network connecting device 20, and the policy table for details analysis within the packet details analyzing unit 16 via the control information communicating unit 31 (arrow A11).

When a packet is input to the network connecting device 20, the session managing unit references the policy table 25 by using the information stored in the header of the packet, obtains a policy whose policy search key matches the information within the header, generates session data based on the policy, and stores the session data in the session table 22a' (arrow A12).

If "server transfer: ON" is stored in the applied service type entry of the session data, the process distributing unit 26 transfers the packet to the packet details analyzing unit 16 via the packet communicating unit 33. The packet details analyzing unit 16 analyzes the packet by using the policy table for details analysis and the session table for details analysis (arrow A13). The packet details analyzing unit 16 resets the session data stored in the session table 22a' within the network connecting device 20 based on an analysis result of the packet (arrow A14). Once the packet is analyzed, subsequent packets of the session corresponding to the reset session data, which is input to the network connecting device 20 are processed by the service processing unit 27 without being analyzed by the packet details analyzing unit 16, and output from the network connecting device 20 (arrow A15).

The operations of the packet relay processing apparatus according to the fifth preferred embodiment are described below. Since the processes performed by the packet processing unit 21 and the session managing unit 22 are similar to those in the first to the fourth preferred embodiments, their explanations are omitted here. Hereinafter, the processes performed by the process distributing unit 26, the service processing unit 27, and the packet details analyzing unit 16 are explained with an emphasis placed.

Figure 29:
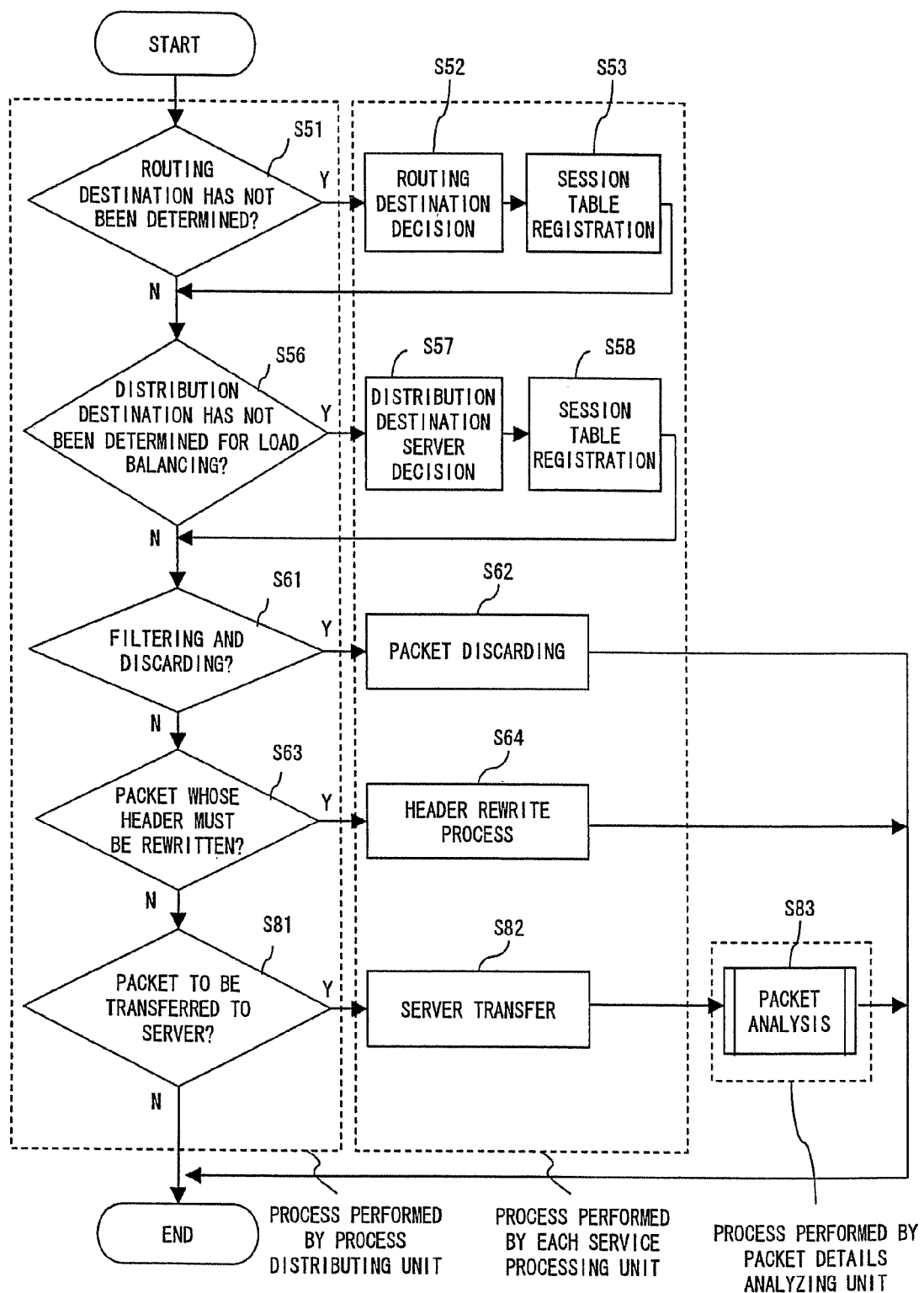
FIG. 29 is a flowchart showing the processes performed by a process distributing unit, a service processing unit, and a packet details analyzing unit according to the fifth preferred embodiment.

FIG. 29 is a flowchart showing the processes performed by the process distributing unit 26 and the service processing unit 27. Among the operations shown in FIG. 29, the operations up to the header rewrite process (step S64) are the same as those in FIG. 20. According to the fifth preferred embodiment, the process distributing unit 26 determines whether or not an input packet is a packet to be transferred to the server 11 based on an applied service type included in session data (step S81). If "server transfer: ON" and an applied service type are set in the applied service type entry, the process distributing unit 26 determines that the packet is a packet to be transferred to the server 11 ("YES" in step S81), and distributes the packet to the service processing unit 27 which performs the process for attaching a header for a transfer to a packet. The service processing unit 27 to which the packet is distributed attaches the header for a transfer to the packet. Contents of the header for a transfer are similar to those in the fourth preferred embodiment. The packet to which the header for a transfer is attached is transferred to the packet details analyzing unit 16 within the server 11 via the packet communicating unit 33 (step S82). The packet details analyzing unit 16 analyzes the received packet, and resets the session data stored in the session table 22a' via the control information communicating unit 31 based on an analysis result (step S83).

Figure 30:
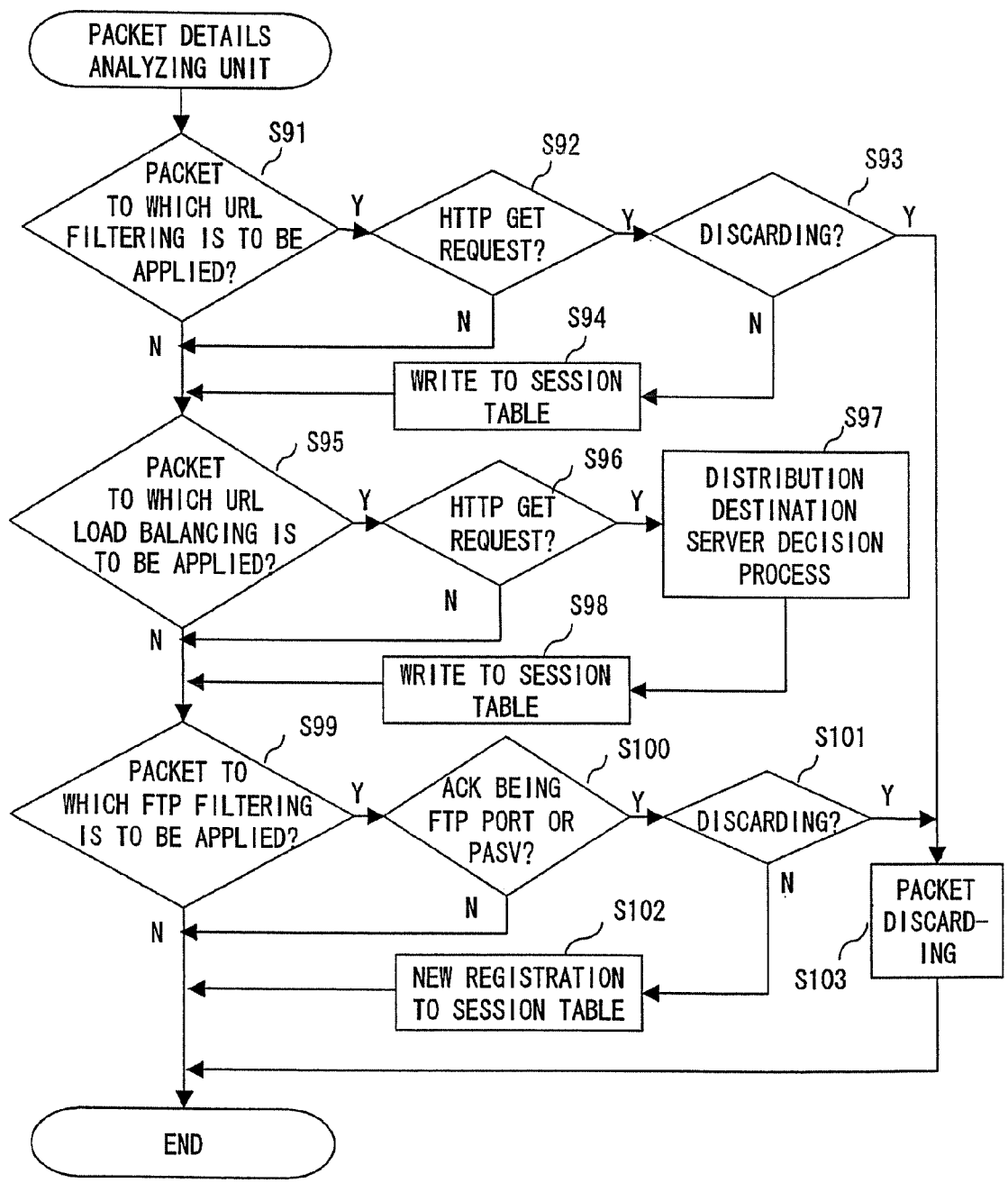
FIG. 30 is a flowchart showing the process performed by the packet details analyzing unit.

FIG. 30 is a flowchart showing the process performed by the packet details analyzing unit 16. The process shown in FIG. 30 corresponds to step S83 of FIG. 29. This preferred embodiment exemplifies the case where the URL filtering, the URL load balancing, and the FTP filtering services are applied by using the packet details analyzing unit 16.

Firstly, the URL filtering service is explained.

The service controlling unit 14 within the server 11 presets a policy which "transfers a packet to the packet details analyzing unit 16, and performs URL filtering" in the policy table 25 via the control information communicating unit 31.

The packet details analyzing unit 16 determines that the packet is a packet to which the URL filtering service is to be applied based on the applied service type "URL filtering" included in the header for a transfer of the received packet. The packet details analyzing unit 16 then generates session data based on the information included in the received packet, and stores the generated session data in the session table for details analysis ("YES" in step S91). Thereafter, the packet details analyzing unit 17 manages the state of the session, and outputs a received packet unchanged to the network until receiving an HTTP GET request.

When the HTTP GET request is received after the session state makes a transition to ESTAB ("YES" in step S92), the packet details analyzing unit 16 determines the URL, and determines whether to pass or to discard the packet. Namely, the packet details analyzing unit 16 determines whether to pass or to discard the packet by referencing a preset table for URL filtering, which is included in the policy table for details analysis (step S93).

If the packet details analyzing unit 16 determines to discard the packet ("YES" in step S93), it discards the packet of the session (step S103). Furthermore, the packet details analyzing unit 16 references the session table 22a' by using the session ID included in the packet, and rewrites the applied service type entry of the session data corresponding to the session ID from "server transfer: ON, URL filtering" to "server transfer: OFF, discarding" (not shown).

If the packet details analyzing unit 16 determines to pass the packet ("NO" in step S93), it references the session table 22a', and rewrites the applied service type entry of the session data corresponding to the session ID included in the packet from "server transfer ON, URL filtering" to "server transfer: OFF, filtering and passing" (step S94). The session data whose session IDs are 0 and 1 in the session table 22a' shown in FIGS. 22 and 24 exemplify session data before and after a packet is analyzed in the case of the URL filtering.

After resetting the session data within the session table 22a', the packet details analyzing unit 16 deletes the session data corresponding to the session ID from the session table for details analysis (not shown).

As described above, if the packet details analyzing unit 16 resets the applied service type of session data within the session table 22a' of the network connecting device 20 from "server transfer: ON, URL filtering" to "server transfer: OFF, filtering and passing" or "server transfer: OFF, discarding", the network connecting device 20 processes subsequent packets according to the above described passage condition. Namely, the network connecting device 20 passes or discards a packet without transferring the packet to the packet details analyzing unit 16 within the server 11.

Figure 31:
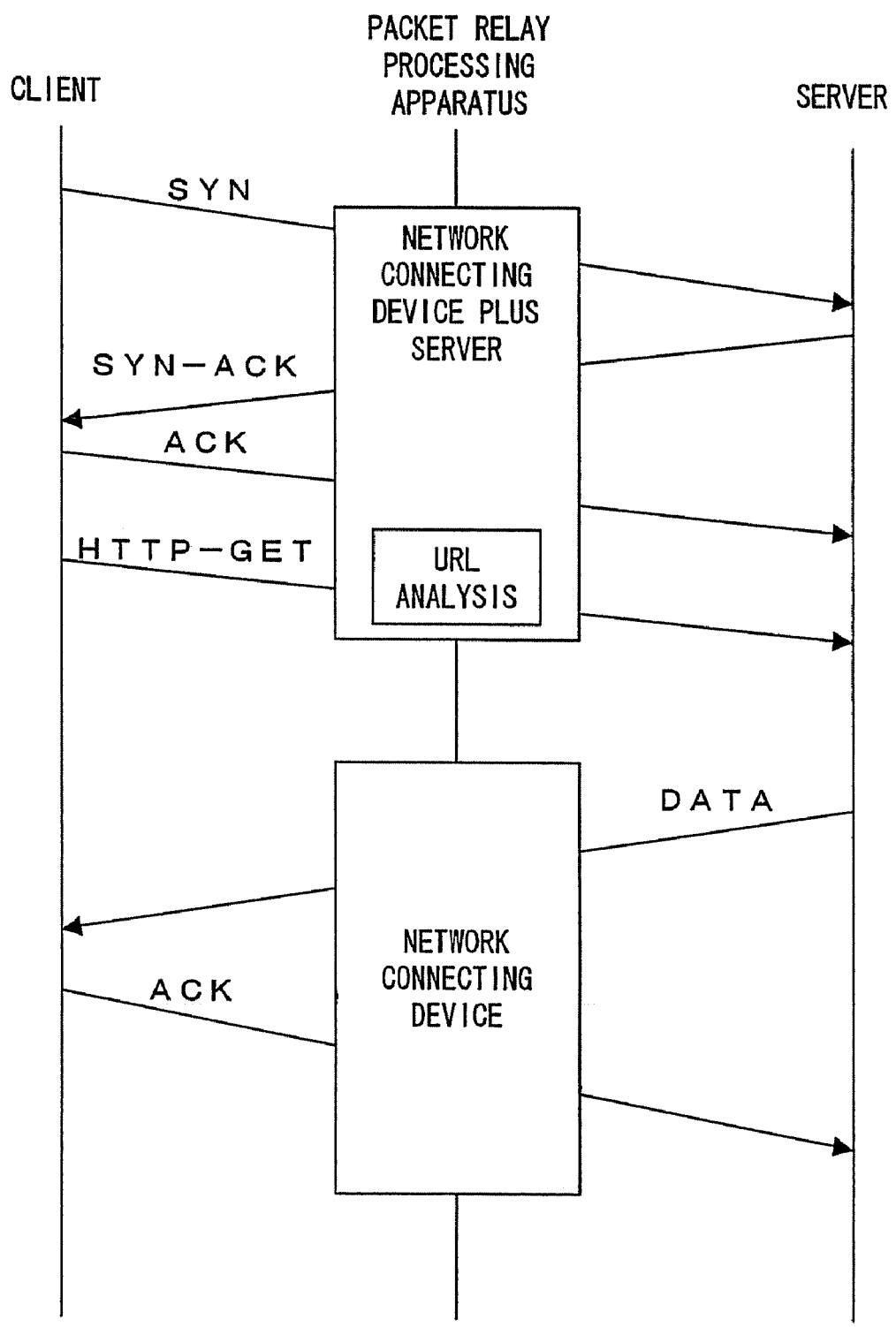
FIG. 31 explains the operations of URL filtering.

FIG. 31 explains the operations of the above described URL filtering service.

SYN, SYN_ACK, and ACK packets are exchanged between a client and a server. Until the session makes a transition to the ESTAB state, these packets are transferred from the network connecting device 20 to the packet details analyzing unit 16, which manages the state of the session. Namely, the process is performed by the network connecting device 20 and the server 11.

Upon receipt of a packet, to which a URL is attached, like an HTTP GET request GET"http://www.xxx.co.jp" after the session makes a transition to the ESTAB state, the packet details analyzing unit 16 within the server 11 determines whether to pass or to discard the above described packet by referencing the table for URL filtering, which is included in the policy table for details analysis, and rewrites the applied service type entry of the session table 22a' to "discarding" or "passing" based on a determination result.

Thereafter, the network connecting device 20 passes or discards packets of the session according to the applied service type set in the session table 22a' until the session terminates. Namely, the process is performed by the network connecting device 20.

Next, the URL load balancing service is described by turning back to FIG. 30.

With the URL load balancing, for example, after a client accesses a certain representative server, another server connected to the representative server is determined as a distribution destination server based on a URL, and a session is distributed to the distribution destination server, so that the load can be distributed to a plurality of distribution destination servers.

When the URL load balancing is made, the service controlling unit 14 within the server 11 first sets a policy which "transfers a packet to the packet details analyzing unit 16, and makes URL load balancing" in the applied service type entry of the policy table 25 via the control information communicating unit 31.

According to the set condition, the process distributing unit 26 within the network connecting device 20 transfers a corresponding packet to the packet details analyzing unit 16 within the server 11.

The packet details analyzing unit 16 determines that the packet is a packet to which the URL load balancing service is to be applied based on the applied service type "URL load balancing" included in the received packet. The packet details analyzing unit 16 generates session data based on the information included in the received packet, and stores the generated data in the session table for details analysis in a similar manner as in the case of the URL filtering. Furthermore, the packet details analyzing unit 16 makes a reply instead of a distribution destination server based on the source address, the destination address, the port numbers, etc., which are included in the header of the packet, registers session data associated with each another in the session table for detailed analysis, and stores the session IDs of the associated session data in an associated session entry of the session data ("YES" in step S95).

In the session table for details analysis shown in FIG. 26, the session data whose session IDs are 2 to 5 are examples of session data in the case of the URL load balancing. In this figure, the session data whose session ID is 2 is associated with the session data whose session ID is 4 each other, and the session data whose session ID is 3 is associated with the session data whose session ID is 5 each other.

The packet details analyzing unit 16 establishes a connection between the client and the server 11, and manages the state of the session thereafter. Additionally, the packet details analyzing unit 16 has a capability for terminating a TCP (Transmission Control Protocol) session, and makes a reply to the client instead of a distribution destination server until the distribution destination server is determined. When the packet details analyzing unit 16 receives an HTTP GET request after the session makes a transition to the ESTAB state ("YES" in step S96), it determines a distribution destination server by referencing a preset table for URL load balancing, which is included in the policy table for details analysis, by using the URL included in the packet (step S97). Thereafter, the server 11 establishes a connection to the distribution destination server by exchanging SYN, SYN_ACK, and ACK packets.

Additionally, the packet details analyzing unit 16 references the session table 22a' within the network connecting device 20, and obtains session data corresponding to the session ID included in the packet. The packet details analyzing unit 16 then rewrites the applied service type included in the obtained session data from "server transfer: ON, URL load balancing" to "server transfer: OFF, header rewrite". Furthermore, the packet details analyzing unit 16 sets the IP address: port number, a sequence number difference, and an ACK number difference in a service-specific information entry of the session data according to the IP address, etc. of the determined distribution destination server (step S98). As a result, the two pieces of session data that are determined to be associated with each other can be merged into one piece of session data, whereby the two connections can be handled as one connection. Then, the packet details analyzing unit 16 deletes the remaining two pieces of data which become unnecessary among the four pieces of session data from the session table 22a'.

After resetting the session data within the session table 22a', the packet details analyzing unit 16 deletes the session data corresponding to the session IDs from the session table for details analysis (not shown). The server 11 then transmits an HTTP GET request to the distribution destination server.

The session data whose session IDs are 2 to 5 within the session table 22a' shown in FIGS. 22 and 24 are examples of session data before and after packets are analyzed in the case of the URL load balancing. Two connections indicated by the two pieces of session data whose session IDs are 2 and 4 in FIG. 22 are merged into one connection indicated by the session data whose session ID is 2 in FIG. 24. Similarly, two connections indicated by the two pieces of session data whose session IDs are 3 and 5 in FIG. 22 are merged into one connection indicated by the session data whose session ID is 5 in FIG. 24.

Once a packet is analyzed, subsequent packets of the session are not transmitted to the packet details analyzing unit 16. After the service processing unit 27 that performs the header rewrite process within the network connecting device 20 rewrites the IP address: port number, the sequence number, and the ACK number within the packet based on the service-specific information within the session data stored in the session table 22a', it outputs the packet to the network.

Figure 32:
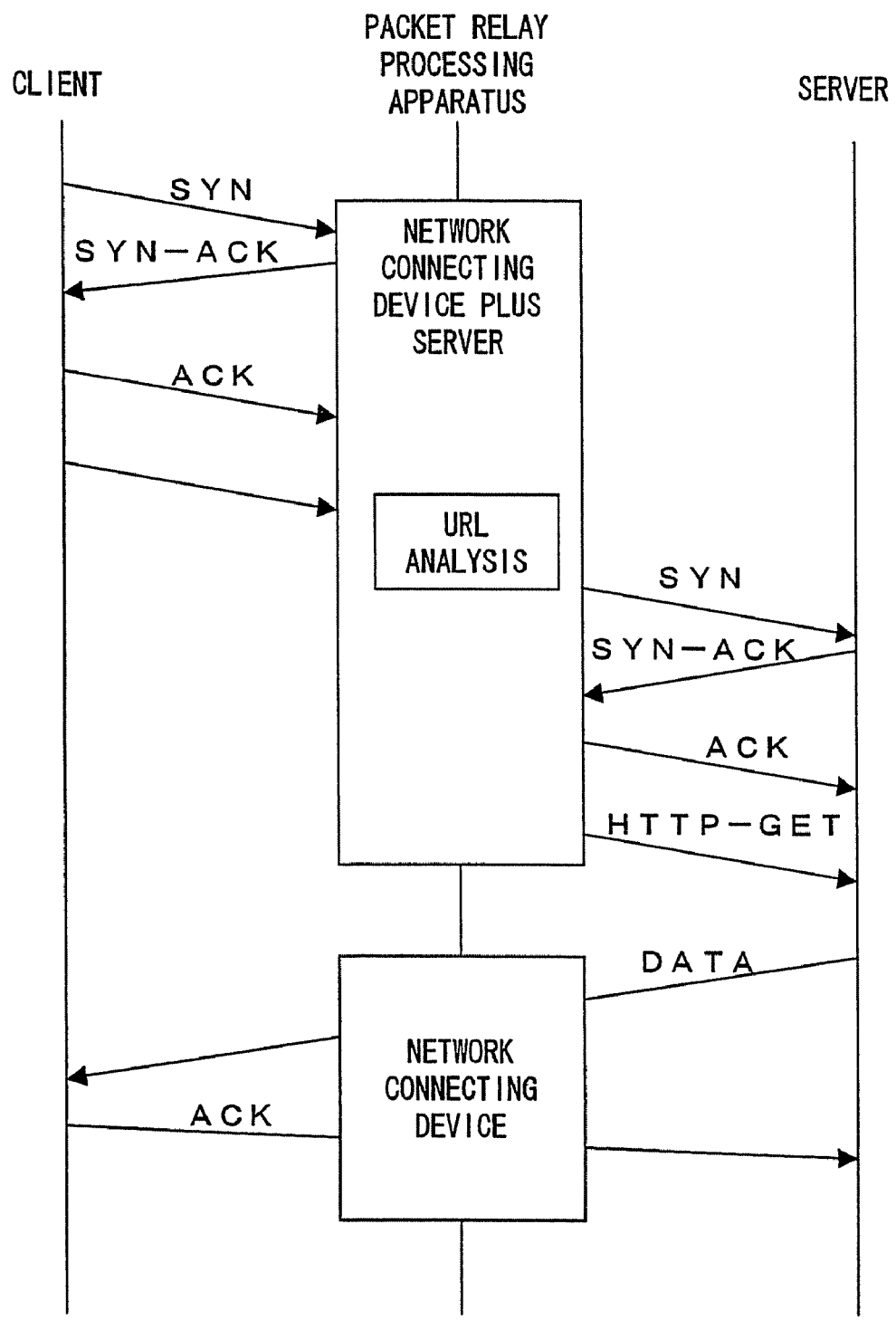
FIG. 32 explains the operations of a URL load balancing service.

FIG. 32 explains the operations of the above described URL load balancing service.

As shown in this figure, SYN, SYN_ACK, and ACK packets are exchanged between a client and a packet relay processing apparatus. Upon receipt of an HTTP GET request after the session makes a transition to the ESTAB state, the packet details analyzing unit 16 determines the URL of the GET request, and determines a distribution destination server.

Then, SYN, SYN_ACK, and ACK packets are exchanged between the packet relay processing apparatus and the distribution destination server in a similar manner as described above, and the HTTP GET request is transmitted to the distribution destination server. Up to this operation, the process is performed by the network connecting device 20 and the server 11.

Until the session terminates after the packet relay processing apparatus transmits the HTTP GET request to the distribution destination server, the network connecting device 20 performs a relay process between the client and the distribution destination server based on the session data stored in the session table 22a'.

Next, the FTP filtering service is described by turning back to FIG. 30. The FTP is composed of a plurality of TCP connections such as a control connection for performing control, and one or more data connections for transferring data.

The service controlling unit 14 within the server 11 presets a policy which "transfers a packet to the packet details analyzing unit 16, and performs FTP filtering" in the policy table 25 via the control information communicating unit 31.

The process distributing unit 26 within the network connecting device 20 transfers a corresponding packet to the details analyzing unit 16 according to the preset condition. In a similar manner as in the case of the URL filtering, the packet details analyzing unit 16 determines that the packet is a packet to which the FTP filtering service is to be applied based on the applied service type included in the received packet, and stores session data in the session table for details analysis ("YES" in step S99). Then, the packet details analyzing unit 16 manages the state of the session, and outputs the received packet to the network unchanged.

Upon receipt of an ACK packet being an FTP PORT or PASV command ("YES" in step S100) after the session makes a transition to the ESTAB state, the packet details analyzing unit 16 determines the IP address and port number included in the packet, and determines whether to pass or to discard the packet of this session based on a determination result (step S101).

Namely, the packet details analyzing unit 16 references a preset table for FTP filtering within the policy table for details analysis by using the IP address and port, and determines whether to pass or to discard the packet of the session. If the packet details analyzing unit 16 determines to discard the packet ("YES" in step S101), it obtains the session data corresponding to the session ID included in the header for a transfer of the packet from the session table 22a', sets "discarding" in the applied service type entry of the session data, and discards the packet (step S103).

Or, if the packet details analyzing unit 16 determines to pass the packet ("NO" in step S101), it registers the session data of the data connection to the session table 22a' based on the IP address and port number, which are described in the data portion of the above described ACK packet being the PORT or the PASV command, and sets "filtering and passing" in the applied service type entry of the session data (step S102).

If the packet details analyzing unit 16 resets the session data within the session table 22a' as described above, the network connecting device 20 processes subsequent packets of the data connection according to the above described passage condition. Namely, the packets of the data connection are passed or discarded without being transferred to the packet details analyzing unit 16 within the server 11.

Figure 33:
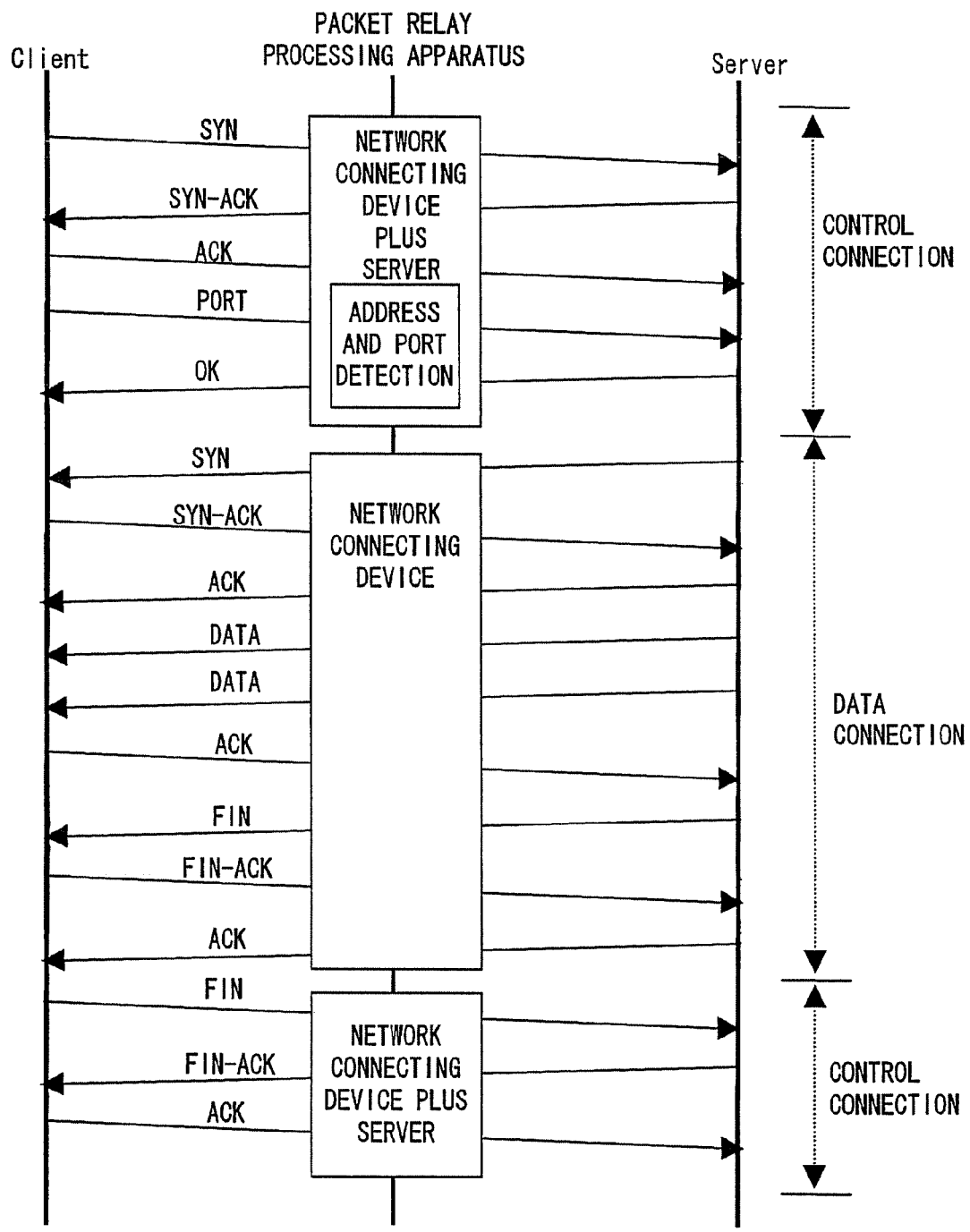
FIG. 33 explains the operations of FTP filtering.

FIG. 33 explains the operations of the above described FTP filtering service. Until a session makes a transition to the ESTAB state after SYN, SYN_ACK, and ACK packets are exchanged between a client and the server 11, and packets are transferred to the above described packet details analyzing unit 16. Namely, the process is performed by the network connecting device 20 and the server 11.

Upon receipt of an ACK packet (to which IP address and port number are attached) being an FTP PORT or PASV command, the packet details analyzing unit 16 references the policy table for details analysis by using the IP address and port number, which are included in the packet, and determines whether to discard or to pass the packet. If the packet details analyzing unit 16 determines to discard the packet, it resets the applied service type entry in the session data within the session table 22a' to "discarding". Or, if the packet details analyzing unit 16 determines to pass the packet, it registers the session data of the data connection in the session table 22a', and sets the applied service type entry of the session data of the data connection to "passing". Thereafter, the network connecting device 20 discards a packet, or passes a packet of the data connection packet.

Lastly, when the packet relay processing apparatus receives a FIN packet of the control connection from the client, this packet is transferred from the network connecting device 20 to the session details analyzing unit 16 within the server 11 via the packet communicating unit 33. The server 11 performs a closing process of the session via the packet details analyzing unit 16. Furthermore, the packet details analyzing unit 16 deletes the session data of the closed session based on the session ID included in the header for a transfer within the packet.

Figure 34:
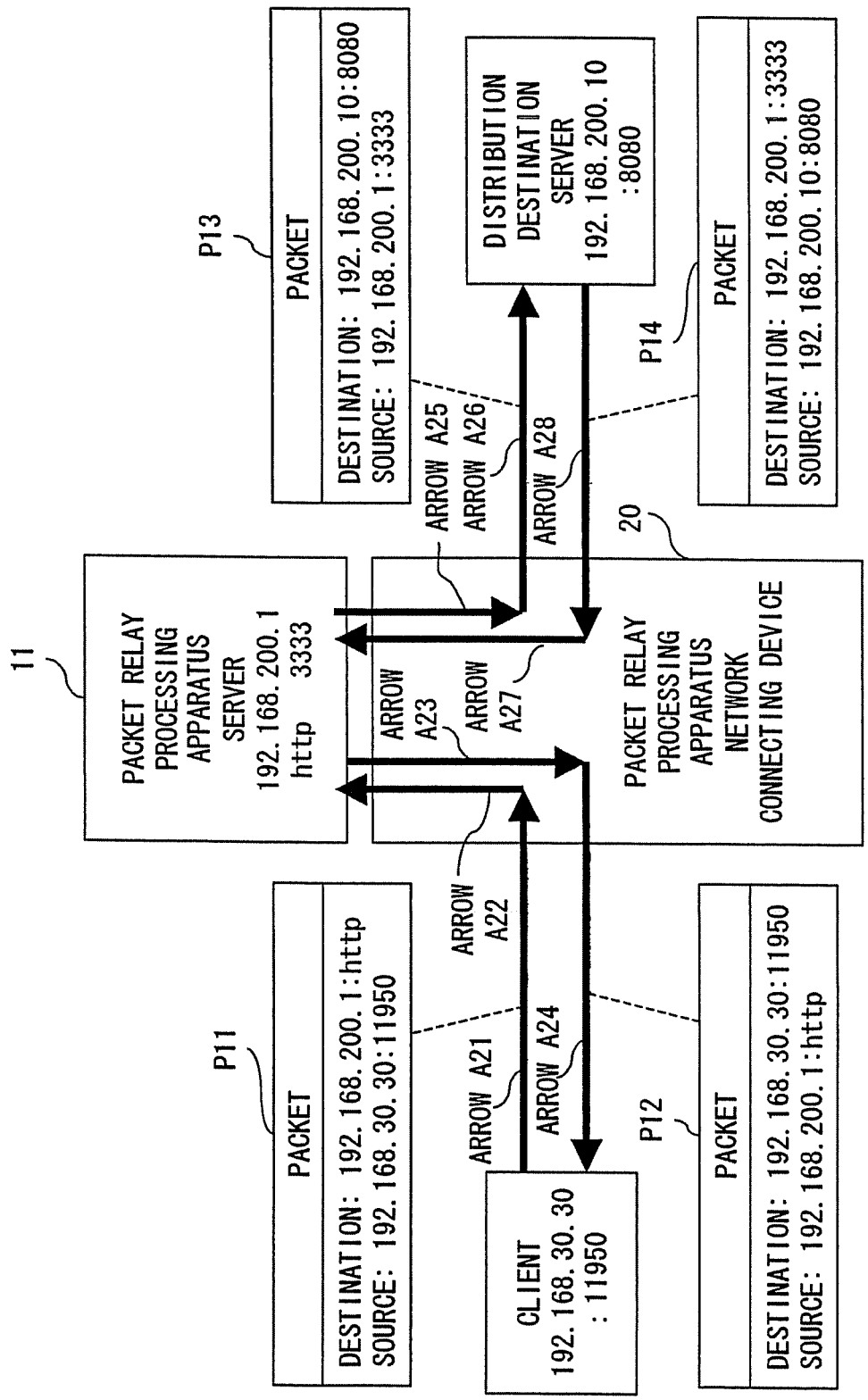
FIG. 34 shows the packet flow in a URL load balancing service before details of a packet are analyzed in the fifth preferred embodiment.

The packet flows in the fifth preferred embodiment are explained below with reference to FIGS. 34 and 35 by taking the case of the URL load balancing service. Note that these figures correspond to the session data whose session IDs are 2 to 5, which are stored in the session tables shown in FIGS. 22, 24, and 26. FIG. 34 shows the packet flow before the packet details analyzing unit 16 resets session data.

Before the session data are reset, a packet P11 whose header stores "destination address:port number=192.168.200.1:http, source address:port number=192.168.30.30:11950" is transmitted from a client having an address:port number 192.168.30.30:11950 to the network connecting device 20. The session managing unit 22 within the network connecting device 20 references the policy table 25, obtains a policy whose policy search key matches the information within the header, generates session data whose session ID is 2 based on the obtained policy, and stores the generated session data in the session table 22a'.

Since the applied service type within the session data is "server transfer: ON, URL load balancing", the process distributing unit 26 within the network connecting device 20 distributes the packet to the service processing unit 27 which performs a server transfer process. After the service processing unit 27 to which the packet is distributed attaches a header for a transfer to the packet, the packet is transferred to the server 11 as indicated by an arrow A22. The packet details analyzing unit 16 within the server 11 registers the session data to the session table for details analysis based on the information included in the transferred packet.

Similarly, the session managing unit 22 stores session data whose session IDs are 3, 4, and 5 in the session table 22a' when the server 11 and the distribution destination server output packets P12, P13, and P14 via paths indicated by arrows A23 to A28, and the packet details analyzing unit 16 stores the corresponding session data in the session table for details analysis.

Until receiving the HTTP GET request after registering the session data in the session table, the packet details analyzing unit 16 manages the state of each of the sessions, and outputs the received packet to the network based on the packet flow shown in FIG. 34.

Upon receipt of the HTTP GET request after the session state makes a transition to ESTAB, the packet details analyzing unit 16 analyzes the packet, and resets the session data stored in the session table 22a' based on an analysis result. The session data after being reset are shown in FIG. 24.

Figure 35:
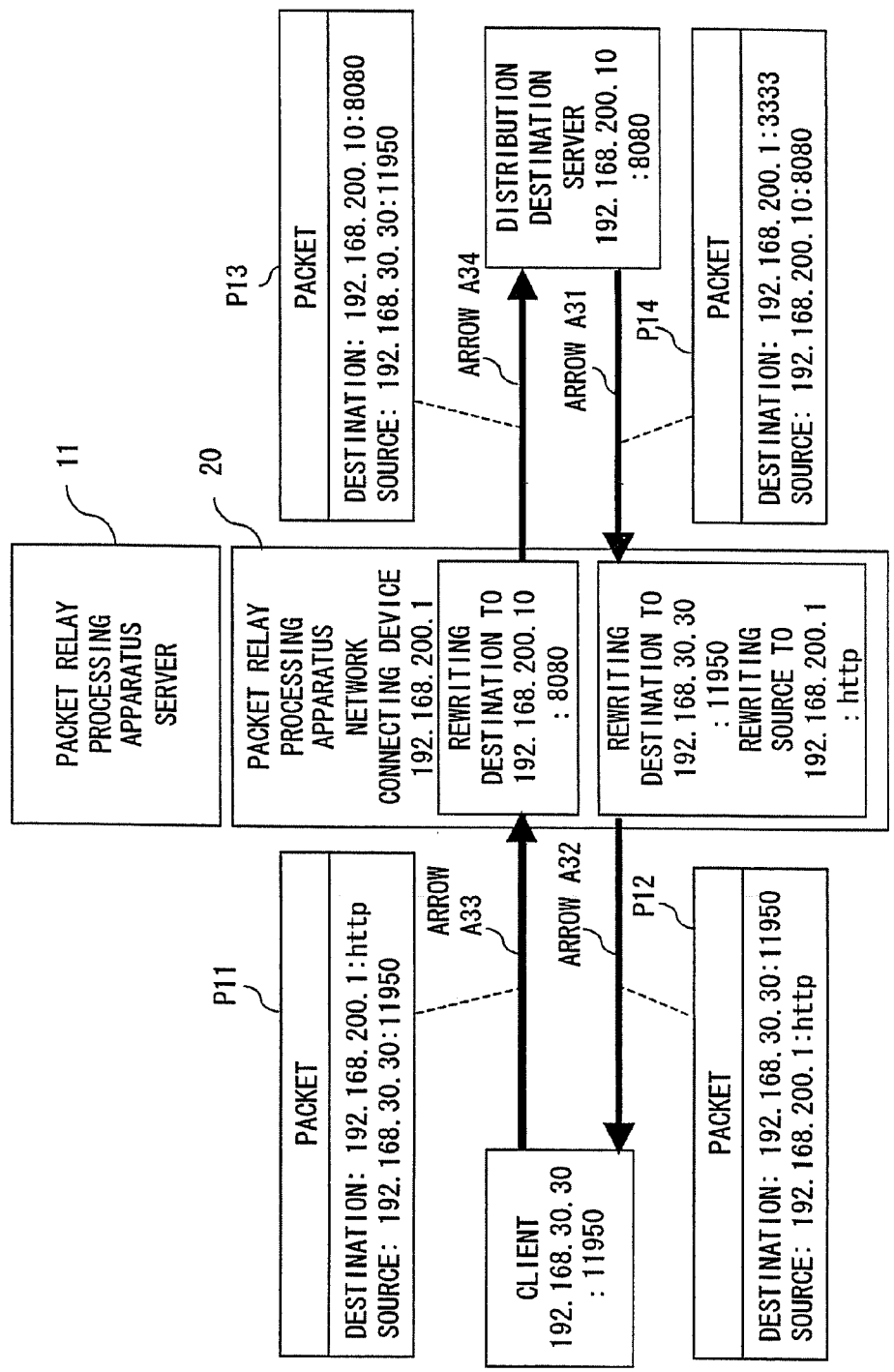
FIG. 35 shows the packet flow in the URL load balancing service after the details of the packet are analyzed in the fifth preferred embodiment.

FIG. 35 shows the packet flow after the packet details analyzing unit 16 resets the session data. After the session data are reset, a packet 14 whose header stores "destination address:port number 192.168.200.1:3333, source address: port number 192.168.200.10:8080" is transmitted from the distribution destination server to the network connecting device 20 as indicated by an arrow A31. The process distributing unit 26 within the network connecting device 20 references the session table 22a' by using the information included in the header of the packet, obtains session data whose session ID is 5, and distributes the packet to the service processing unit 27 which performs a header rewrite process based on the session data. The service processing unit 27 generates a packet P12 by rewriting the destination address and port number within the header of the packet to "192.168.30.30: 11950", and the source address and port number to "192.168.200.1:http" based on the session data. Then, the network connecting device 20 outputs the packet P12 to the client.

Similarly, as indicated by an arrow A33, a packet P11 whose header stores "destination address:port number=192.168.200.1:http, source address:port number=192.168.30.30:11950" is transmitted from the client having the address:port number 192.168.30.30:11950 to the network connecting device 20. The process distributing unit 26 within the network connecting device 20 references the session table 22a' by using the information included in the header of the packet, and obtains session data whose session ID is 2. Since "server transfer: OFF, header rewrite" is stored in the applied service type entry of the obtained session data in this example, the process distributing unit 26 distributes the packet to the service processing unit 27 which performs a header rewrite process. The service processing unit 27 generates a packet P13 by rewriting the destination address and port number within the header of the packet to the address and port number "192.168.200.10:8080" of the distribution destination server. Then, the network connecting device 20 outputs the packet P13 to the distribution destination server as indicated by an arrow A34.

As described above, after the session details analyzing unit 16 rewrites the session data based on the analysis result of the packet, the network connecting device 20 performs a packet relay process not via the server 11.

As stated earlier, in this preferred embodiment, the packet relay processing capability based on session management is arranged in the network connecting device 20, and the capability that is conventionally arranged in a server is implemented by the network connecting device 20, thereby reducing the CPU use ratio of the server 11 in a similar manner as in the first preferred embodiment. Additionally, the consistency of a session currently being continued can be maintained, even if a routing table is changed during the session, in a similar fashion as in the first preferred embodiment.

Furthermore, according to the fifth preferred embodiment, the packet details analyzing unit 16 within the server 11 analyzes a packet, determines a service, and sets the contents of the determined service in the network connecting device 20, so that the network connecting device 20 performs a relay process for the same session based on the contents of the determined service thereafter. Accordingly, a service process can be performed faster than in the case where the server 11 performs all of processes.

Next, modifications of the preferred embodiments are described.

By applying a first modification to the first to the fifth preferred embodiments, session data may be deleted from the session table 22a' not immediately after the session terminates, but after a predetermined time period elapses.

To implement this, the policies in the policy table 25 and session data in the session table 22a' further include a consistency duration as an entry as shown in FIGS. 14 and 15, and 22 to 25. The process performed by the packet relay processing apparatus according to the first modification is explained. In the first modification, part of the process performed by the session managing unit 22 differs from that in the first to the fifth preferred embodiments. The process performed by the session managing unit 22 in the case where the first modification is applied is described with reference to FIG. 6.

If the session managing unit 22 determines that a certain session is closed in step S17 of FIG. 6 ("YES" in step S17), it sets a timer. The process of the session managing unit 22 proceeds to step S18 of FIG. 6 after waiting for the consistency duration included in the session data, and deletes the corresponding session data from the session table 22a'.

As a result, if a session is reestablished until a consistency duration elapses from the termination of the session, the session managing unit 22 can handle the session as a session identical to the previously terminated session if the session search key does not change. For example, in the load balancing service, a packet can be distributed to the same distribution destination server both in a terminated session and a reestablished session. Consequently, a search in the policy table 25, which is made by the session managing unit 22, and a packet transfer to the server 11, which is made by the process distributing unit 26, can be omitted, thereby processing a packet at high speed.

Next, a second modification is explained. By applying the second modification to the third to the fifth preferred embodiments, a policy applied to a session may be easily turned on/off. To implement this, according to the second modification, a plurality of policies are divided into groups. Furthermore, a policy stored in the policy table 25 further includes as an entry a group ID for identifying a group to which the policy belongs as shown in FIG. 15, and the network connecting device 20 further comprises a flag table shown in FIG. 36.

The data configuration of the flag table is described below with reference to FIG. 36. As shown in this figure, the flag table stores a flag indicating whether a policy is either valid or invalid for each group ID. FIG. 36 shows an example where a policy is invalid if the flag is OFF (0), and valid if the flag is ON (1).

The process performed by the packet relay processing apparatus according to the second modification is explained below. In the second modification, part of the process performed by the session managing unit 22 differs from that in the third to the fifth preferred embodiments. A point, which is changed by applying the second modification to the preferred embodiments, in the process performed by the session managing unit 22 is described in detail with reference to FIG. 16 that shows the process performed by the session managing unit 22 according to the third preferred embodiment as an example.

In the second modification, the session managing unit 22 further performs the following operations between steps S43 and S44 of FIG. 16. Firstly, in step S43, the session managing unit 22 searches the policy table 25, and obtains a policy having a policy search key that matches information stored in the header of a packet. The session managing unit 22 references the flag table by using the group ID included in the obtained policy, and determines whether the flag corresponding to the group ID is either ON or OFF.

If the flag is OFF as a result of the determination, the session managing unit 22 does not adopt the policy. If the flag is ON, the session managing unit 22 adopts the policy. The session managing unit 22 generates session data based on the policy in step S44, and stores the generated session data in the session table 22a'. In this way, a policy to be adopted can be turned on/off for each group.

For example, if a plurality of normal policies and a plurality of exceptional policies are generated, a normal group composed of normal policies and an exceptional group composed of exceptional policies are predefined, and both the normal and the exceptional policies are registered to the policy table 25, according to the second modification. Furthermore, a flag corresponding to a group that a user of the packet relay processing apparatus desires to validate, namely, the normal or the exceptional group is turned on. In this way, the normal and the exceptional policies can be easily turned on/off for each group.

Next, a third modification is described. By applying the third modification to the third to the fifth preferred embodiments, a packet log may be recorded. To implement this, according to the third modification, session data and a policy, which are stored in the session table 22a' and the policy table 25 in FIGS. 14 and 15, and 22 to 25, further include as entries event flags.

The event flags include an event flag for a packet, and an event flag for a header. If the event flag for a packet is ON (1), the packet is transferred to the server to record a log (history). If the event flag for a header is ON, the header of the packet is transferred to the server 11 to record a log. The server 11 analyzes the transferred packet or the header of the packet, and records a log. As a result, information helpful for restoring a system from a fault can be obtained by analyzing a recorded log with network administration software, for example, when the fault occurs in the system.

Next, a fourth modification is explained. According to the fourth modification, the network connecting devices 20 according to the first to the fifth preferred embodiments further comprise a counter (not shown) in order to obtain statistical information of a packet. The network controlling unit 12 or the service controlling unit 14 within the server 11 references the value of the counter. For example, the numbers of input and output packets for each interface are considered as statistical information. The statistical information may be used when billing a client.

Furthermore, in the third to the fifth preferred embodiments, the number of sessions to which a policy is applied, namely, the number of policy hits, which is the number of times that a policy hits may be further obtained as statistical information for each policy stored in the policy table 25.

To implement this, according to the fourth modification, each policy stored in the policy table 25 further includes the number of policy hits as an entry as shown in FIG. 15. When the session managing unit 22 references the policy table 25 to obtain a policy to be applied in order to register the session data of a new session to the session table 22a', the counter increments the number of policy hits of the obtained policy. In this way, a network administrator can obtain the information for determining whether or not a policy is effectively used.

Furthermore, in the third to the fifth preferred embodiments, the number of distribution destination hits, which indicates the number of times that a session is distributed, may be further obtained as statistical information for each distribution destination server in the load balancing service.

To implement this, each policy for the load balancing service, which is stored in the policy table 25 shown in FIG. 15 or the policy table for details analysis shown in FIG. 27, further includes as an entry the number of distribution destination hits for each distribution destination server address. Each time the service processing unit 27 or the packet details analyzing unit 16 performs a process for determining a distribution destination server in a session, the counter increments the number of distribution destination hits, which corresponds to the server determined as a distribution destination server. In this way, a network administrator can obtain the information for determining whether or not a load balancing method effectively runs.

Programs describing the processes performed by the units that configure the network connecting device 20 and the server 11, which are explained in the above described preferred embodiments, are recorded in a memory such as a RAM (Random Access Memory), a ROM (Read Only Memory), etc. These programs may be arranged as hardware or software in the packet relay processing apparatuses.

This case is explained below.

Figure 37:
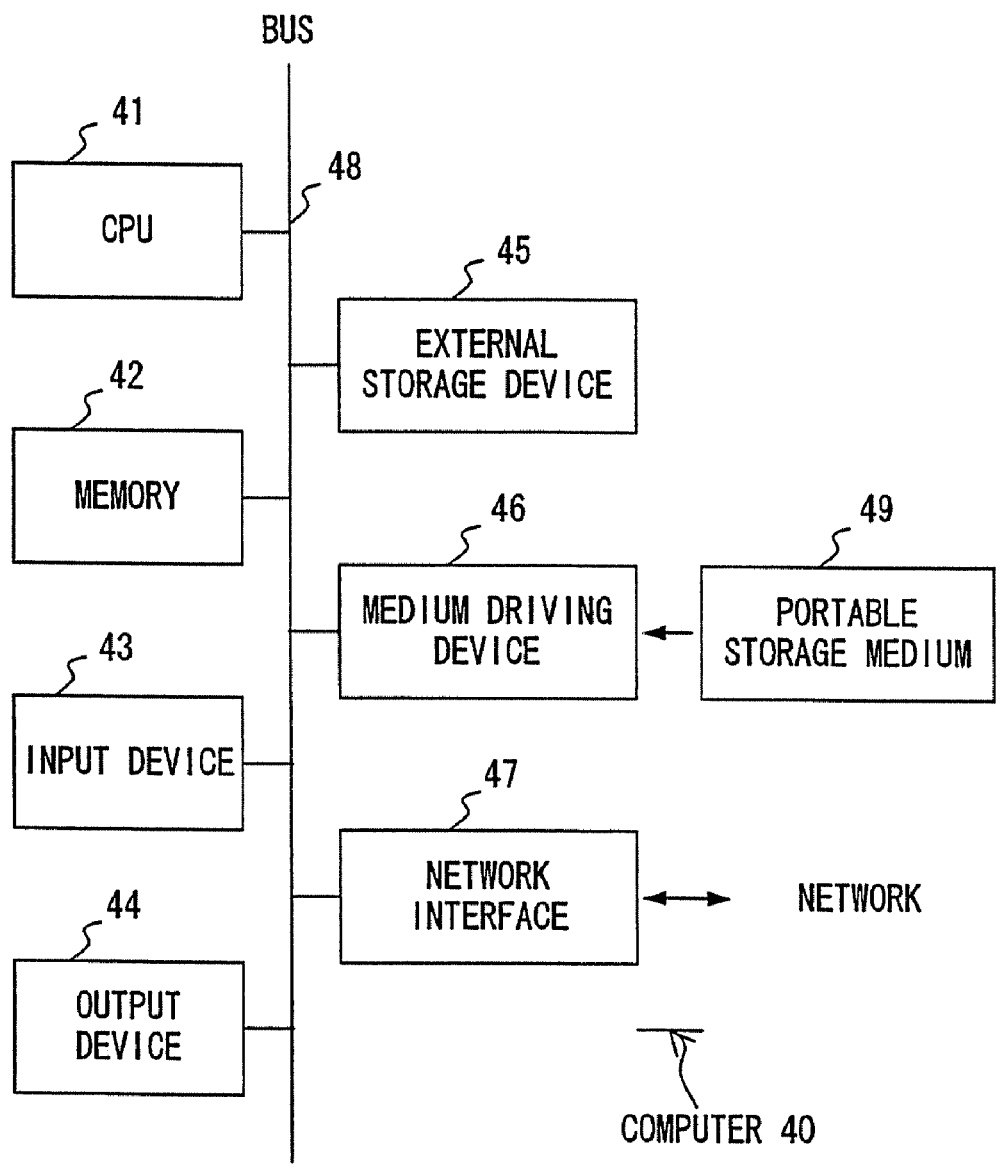
FIG. 37 shows the configuration of a computer.

FIG. 37 shows the configuration of a computer (information processing device). As shown in this figure, a computer 40 comprises at least a CPU 41, and a memory 42. The computer 40 may further comprise an input device 43, an output device 44, an external storage device 45, a medium driving device 46, and a network interface 47. These devices are interconnected by a bus 48.

The memory 42 includes, for example, a ROM, a RAM, etc., and stores a program and data, which are used for processes. The CPU 41 performs necessary processes by executing the program with the memory 42.

To make two or more computers 40 implement the capabilities corresponding to the server 11 and the network connecting device 20, which configure a packet relay processing apparatus, programs describing the processes performed by the respective units that configure the packet relay processing apparatus shown in FIGS. 3, 11, 13, 19, and 21 are prepared. Then, the program describing the processes performed by the units that the server 11 comprises (hereinafter referred to as a program for the server 11) is stored in a particular program code segment of the memory 42 within the computer to implement the server 11.

In addition, the program describing the processes performed by the units that the network connecting device 20 comprises (hereinafter referred to as a program for the network connecting device 20) is stored in a particular program code segment of the memory 42 within the computer to implement the network connecting device 20. Here, the CPU of the computer to implement the network connecting device 20 is, for example, a network processor. The processes performed by the above described units are earlier explained with the flowcharts.

The input device 43 is, for example, a keyboard, a pointing device, a touch panel, etc., and is used to input an instruction or information from a user or other computers, etc. The output device 44 is, for example, a display, a printer, etc., and is used to output an inquiry to a user of the computer 40, a process result, etc.

The external storage device 45 is, for example, a magnetic disk device, an optical disk device, a magneto-optical disk device, etc. The above described programs and data are stored in the external storage device 45, and may be used by being loaded into the memory 42 on demand.

The medium driving device 46 drives a portable storage medium 49, and accesses its recorded contents. As the portable storage medium 49, an arbitrary computer-readable storage medium such as a memory card, a memory stick, a flexible disk, a CD-ROM (Compact Disc-Read Only Memory), an optical disk, a magneto-optical disk, a DVD (Digital Versatile Disk), etc. is used. The above described programs and data are stored onto the portable storage medium 49, and may be used by being loaded into the memory 42 on demand.

The network interface 47 communicates with an external device via an arbitrary network (line) such as a LAN, a WAN, etc., and performs data conversion accompanying a communication. Additionally, the network interface 47 receives the above described programs and data from an external device, and the program and data can be used by being loaded into the memory 42 on demand.

FIG. 38 explains a computer-readable storage medium and a transmission signal, which can provide programs and data to the computer shown in FIG. 37.

By providing the above described programs and data stored in the tables to computers to respectively implement the server 11 and the network connecting device 20 with a storage medium, etc., two or more computers are enabled to implement the capabilities corresponding to a packet relay processing apparatus.

To implement this, the above described programs and data are prestored in the computer-readable storage medium 49. As shown in FIG. 38, a computer to implement the server 11 is made to read the program for the server 11, etc. from the portable storage medium 49 with the medium driving device 46, the program, etc. are once stored in the memory 42 or the external storage device 45 of the computer (server 11), and the CPU 41 comprised by the computer (server 11) is made to read and execute the stored program.

Similarly, the program for the network connecting device 20, etc. are read from the portable storage medium 49, once stored in the memory 42, etc. of the computer to implement the network connecting device 20, and the CPU 41 comprised by the computer (network connecting device 20) is made to read and execute the stored program.

Additionally, the programs may be respectively downloaded from a DB 50, which is possessed by a program (data) provider, into the computers to implement the server 11 and the network connecting device 20 via a communications line (network) 51 instead of making the computers read the programs, etc. from the storage medium 49. In this case, for example, a computer that comprises the DB 50 and transmits the programs converts the above described programs and data into program and data signals, obtains transmission signals by modulating the converted program and data signals with a modem, and outputs the obtained transmission signals to the communications line 51 (transmission medium). The computers that receive the programs obtain the program and data signals by demodulating the received transmission signals with a modem, and further obtain the programs and data by converting the obtained program and data signals.

Next, loading of the programs and data into the computers to implement the server 11 and the network connecting device 20 are explained in detail by citing an example with reference to FIG. 39.

As shown in this figure, the computers to implement the server 11 and the network connecting device 20, which respectively comprise a CPU and a memory, are interconnected by the above described control information communicating unit 31. For example, if the control information communicating unit 31 is a PCI bus, the network connecting device may be implemented as a NIC (Network Interface Card) for PCI.

For instance, if there is a storage medium on which is recorded the programs, etc. (firmware) for the server 11 and the network connecting device 20, the programs for the server 11 and the network connecting device 20, etc. are loaded from the storage medium into the memory of the server 11 by using a medium driving device which is comprised by the computer to implement the server 11 and is not shown (arrow A41). Then, the program for the network connecting device 20, etc., which are stored in the memory of the server 11, are loaded into the memory of the network connecting device 20 via the control information communicating unit 31 (arrow A42). In this way, the necessary programs, etc. can be provided to the computers to implement the server 11 and the network connecting device 20. The CPU of the server 11 executes the program for the server 11, which is loaded into the memory of the server 11, whereas the CPU of the network connecting device 20 executes the program for the network connecting device 20, which is loaded into the memory of the network connecting device 20.

Needless to say, the programs, etc. may be prestored onto a ROM, etc. instead of being loaded from a storage medium as described above. Additionally, the programs, etc. may be provided to the computer to implement the server 11 by using transmission signals instead of a storage medium.

Furthermore, the respective units, which configure the network connecting device 20, may be configured as hardware by using an ASIC (Application Specific Integrated Circuit) in place of the CPU in the network connecting device 20.

As described above, according to the present invention, the following effects can be obtained.

(1) A packet relay processing unit based on session management is arranged in a network connecting device, which is made to perform a relay process based on the session management, thereby reducing the CPU use ratio of the server. Additionally, in the network connecting device, session management is made, and an output destination is registered to a session table at the start of a session, whereby the consistency of a session currently being continued can be maintained, even if a routing table is changed during the session.

(2) An external session managing unit is arranged in the server of the packet relay processing apparatus, and the network connecting device transfers session information to the server, which then makes session management. As a result, a session which overflows in the network connecting device can be managed by the server, even if the number of sessions exceeds the member registered to the session table.

(3) A process distributing unit and a plurality of service processing units are arranged in a network connecting device which can perform a process faster than a server, thereby reducing the CPU use ratio of the server, and speeding up a service process.

(4) An external service processing unit is arranged in a server, and both a network connecting device and the server are enabled to execute a service process. Consequently, a service process that is difficult to be implemented by the network connecting device can be executed by the server, and the network connecting device performs a relay process based on the contents of a determined service, whereby a service process can be executed faster than in the case where the server performs all of service processes.

While the invention has been described with reference to the preferred embodiments thereof, various modifications and changes may be made to those skilled in the art without departing from the true spirit and scope of the invention as defined by the claims thereof.

What is claimed is:

1. A packet relay processing apparatus having a network connecting device as a network adapter, wherein the network connecting device comprises:

session managing unit managing a session;

a packet processing unit relaying a packet based on session management made by said session managing unit;

a routing table storing routing information about a routing destination of the packet;

a routing processing unit determining the routing destination of the packet based on the routing information at the start of the session;

a process distributing unit; and a plurality of service processing units, wherein said packet processing unit outputs the packet to the routing destination, said process distributing unit distributes the packet to at least one of the plurality of service processing units based on contents of a service for the packet, the service processing unit to which the packet is distributed performs a service process for the packet, said session managing unit searches a session table, in which the session information about the session above is stored, by using information included in the packet as a search key, upon receipt of the packet, if corresponding session information is not registered to said session table as a result of the search, said session managing unit obtains a corresponding policy from a policy table, in which the policy containing the regulations for performing service towards the packet is stored, by using the information included in the packet as a search key, and writes session information to said session table based on the obtained policy, and if corresponding information is registered to said session table as a result of the search, said session managing unit manages the session information stored in said session table based on a state of the session.

2. The packet relay processing apparatus according to claim 1, further having a server, wherein the server comprises a network controlling unit writing routing information to said routing table.

3. The packet relay processing apparatus according to claim 1, further having a server, wherein:
the server comprises
an external session managing unit managing a session;
said session managing unit transfers session information about a session depending on a given condition; and
said external session managing unit manages the session based on received session information.

4. The packet relay processing apparatus according to claim 1, further having a server, wherein: the server comprises an external service processing unit; said process distributing unit transfers a packet to the server depending on a given condition; and said external service processing unit performs a service process for a received packet.

5. The packet relay processing apparatus according to claim 1, further having a server, wherein:
the server comprises a packet details analyzing unit;
the network connecting device further comprises
a process distributing unit, and
a plurality of service processing units;
said process distributing unit transfers a packet to said packet details analyzing unit depending on a given condition; and
said packet details analyzing unit determines contents of a service for the packet by analyzing the packet and sets the determined contents of the service in the network connecting device; and
the network connecting device processes the packet based on the contents of the determined service, after the contents of the service are set.

6. The packet relay processing apparatus according to claim 5, wherein
if a packet transferred to the sewer is an HTTP protocol GET packet, said packet details analyzing unit determines a service for the packet based on a URL (Uniform Resource Locator) included in the packet.

7. The packet relay processing apparatus according to claim 5, wherein
if a packet transferred to the server is an ACK packet for an FTP protocol PORT or PASV command, said packet details analyzing unit determines a service for the packet based on IP address and port number of a data connection corresponding to a session.

8. The packet relay processing apparatus according to claim 5, wherein
said packet details analyzing unit makes a reply instead of a distribution destination server until the distribution destination of a load on the server is determined, if a process for distributing a load on the server is performed.

9. The packet relay processing apparatus according to claim 1 wherein said service processing unit has a capability for rewriting a header of a packet.

10. The packet relay processing apparatus according to claim 1 wherein said service processing unit has a capability for discarding a packet.

11. The packet relay processing apparatus according to claim 1, further having a server, wherein
said service processing unit has a capability for determining a distribution destination of a load in order to distribute a load on the server.

12. The packet relay processing apparatus according to claim 1, wherein
said session managing unit waits for a predetermined time period from a termination of a session, and deletes session information about the terminated session unless the terminated session is resumed while waiting for the predetermined time period.

13. The packet relay processing apparatus according to claim 1, wherein
the network connecting device further comprises
a counter for obtaining statistical information about a packet.

14. A network connecting device as a network adapter for use in a packet relay processing apparatus, comprising:
a session managing unit managing a session;
a packet processing unit relaying a packet based on session management made by said session managing unit;
a routing table storing routing information about a routing destination of the packet;
a routing processing unit determining the routing destination of the packet based on the routing information at the start of the session;
a process distributing unit; and
a plurality of service processing units, wherein
said packet processing unit outputs the packet to the routing destination,
said process distributing unit distributes the packet to at least one of the plurality of service processing units based on contents of a service for the packet,
the service processing unit to which the packet is distributed performs a service process for the packet,
said session managing unit searches a session table, in which the session information about the session above is stored, by using information included in the packet as a search key, upon receipt of the packet,
if corresponding session information is not registered to said session table as a result of the search, said session managing unit obtains a corresponding policy from a policy table, in which the policy containing the regulations for performing service towards the packet is stored, by using the information included in the packet as a search key, and writes session information to said session table based on the obtained policy, and
if corresponding information is registered to said session table as a result of the search, said session managing unit manages the session information stored in said session table based on a state of the session.

15. The network connecting device according to claim 14, further comprising
a server transferring unit transferring session information about a session to a server comprised in the packet relay processing apparatus depending on a given condition, wherein
the server manages the session according to the transferred session information.

16. The network connecting device according to claim 14, further comprising
a process distributing unit, and
a service processing unit, wherein
said process distributing unit transfers a packet to the server comprised in the packet relay processing apparatus depending on a given condition in order to make the server determine a service for the packet; and
the service processing unit processes a packet of the session based on contents of the service determined by the server, after the service is determined by the server.

17. A computer readable storage medium on which is recorded a program for causing a server, which configures a packet relay processing apparatus relaying a packet, to execute a process, wherein a policy is set in a network connecting device as a network adapter, so that the network connecting device comprised in the packet connecting processing apparatus managing a session, relaying the packet based on the session management, determining the routing destination of the packet based on the routing information at the start of the session, outputting the packet to the routing destination if relaying the packet, distributing the packet based on contents of a service for the packet, performing a service process for the distributed packet executes a process, the processes comprising searching a session table which the session information about the session above is stored, by using information included in the packet as a search key, upon, receipt of the packet, obtaining a corresponding policy from a policy table, in which the policy containing the regulations for performing service towards the packet is store, by using the information included in the packet as a search key, and writing session information to said session table based on the obtained policy, if corresponding session information is not registered to said session table as a result of the search; and managing the session information stored in said session table based on a state of the session if corresponding information is registered to said session table as a result of the search.

18. The storage medium according to claim 17, the process further comprising receiving a packet transferred from the network connecting device, and executing the service for the received packet.

19. A computer readable storage medium on which is recorded a program for causing a server, which configures a packet relay processing apparatus relaying a packet, to execute a process, the process comprising:

receiving the packet transferred from a network connecting device as a network adapter comprised in the packet relay processing apparatus, managing a session, relaying the packet based on the session management, determining the routing destination of the packet based on the routing information at the start of the session, outputting the packet to the routing destination if relaying the packet, distributing the packet based on contents of a service for the packet, performing a service process for the distributed packet, searching a session table, in which the session information about the session above is stored, by using information included in the packet as a search key upon receipt of the packet, obtaining a corresponding policy from a policy table, in which the policy containing the regulations for performing service towards the packet is stored, by using the information included in the packet as a search key and writing session information to said session table based on the obtained policy if corresponding session information is not registered to said session table as a result of the search, managing the session information stored in said session table based on a state of the session if corresponding information is registered to said session table as a result of the search;

determining contents of a service for the packet by analyzing the packet; and setting the contents of the determined service in the network connecting device in order to make the network connecting device process the packet based contents of the determined service.

20. A computer readable storage medium on which is recorded data carried on a communication line and representing a program for causing a computer comprised in a network connecting device as a network adapter to execute a process, the process comprising:

managing a session;

relaying a packet based on session management;

determining the routing destination of the packet based on the routing information at the start of the session;

outputting the packet to the routing destination if relaying the packet;

distributing the packet based on contents of a service for the packet;

performing a service process for the distributed packet;

searching said session table, in which the session information about the session above is stored, by using information included in the packet as a search key, upon receipt of the packet in the management of the session;

obtaining a corresponding policy from said policy table, in which the policy containing the regulations for performing service towards the packet is stored, by using the information included in the packet as a search key and writing session information to said session table based on the obtained policy if corresponding session information is not registered to said session table as a result of the search; and managing the session information stored in said session table based on a state of the session if corresponding information is registered to said session table as a result of the search.

21. A computer readable storage medium on which is recorded data carried on a communication line and representing a program for causing a server, which configures a packet relay processing apparatus relaying a packet, to execute a process, the program, wherein a policy is set in a network connecting device as a network adapter so that the network connecting device that configures the packet relay processing apparatus managing a session, relaying the packet based on the session management, determining the routing destination of the packet based on the routing information at the start of the, session, outputting the packet to the routing destination if relaying the packet, distributing the packet based on contents of a service for the packet, performing a service process for the distributed packet executes a process, the processes comprising:

searching said session table, in which the session information about the session above is stored, by using information included in the packet as a search key, upon receipt of the packet;

obtaining a corresponding policy from said policy table, in which the policy containing the regulations for performing service towards the packet is stored, by using the information included in the packet as a search key, and writing session information to said session table based on the obtained policy, if corresponding session information is not registered to said session table as a result of the search; and managing the session information stored in said session table based on a state of the session if corresponding information is registered to said session table as a result of the search.

22. A computer readable storage medium on which is recorded data carried on a communication line and representing a program for causing a server, which configures a packet relay processing apparatus relaying a packet, to execute a process, the program comprising:

receiving the packet transferred from a network connecting device as a network adapter comprised in the packet relay processing apparatus, managing a session, relying the packet based on the session management, determining the routing destination of the packet based on the routing information at the start of the session, outputting the packet to the routing destination if relaying the packet, distributing the packet based on contents of a service for the packet, performing a service process for the distributed packet, searching said session table, in which the session information about the session above is stored, by using information included in the packet as a search key upon receipt of the packet, obtaining a corresponding policy from said policy table, in which the policy containing the regulations for performing service towards the packet is stored, by using the information included in the packet as a search key and writing session information to aid session table based on the obtained policy if corresponding session information is not registered to said session table as a result of the search, managing the session information stored in said session table based on a state of the session if corresponding information is registered to said session as a result of the search;

determining contents of a service for the packet by analyzing the packet; and setting the contents of the determined service in the network connecting device in order to make the network connecting device process the packet based on the contents of the determined service.

* * * * *

UNITED STATES PATENT AND TRADEMARK OFFICE
CERTIFICATE OF CORRECTION

PATENT NO. : 7,433,958 B2
APPLICATION NO. : 11/279338
DATED : October 7, 2008
INVENTOR(S) : Kuniaki Shimada et al.

It is certified that error appears in the above-identified patent and that said Letters Patent is hereby corrected as shown below:

Column 33, Lines 14-18, after "wherein:" delete "the server comprises an external service processing unit; said process distributing unit transfers a packet to the server depending on a given condition; and said external service processing unit performs a service process for a received packet." and insert the same below "wherein:" as a new line.

Column 33, Line 37, change "sewer" to --server--.

Column 33, Line 55, after "claim 1" insert --,--.

Column 33, Line 58, after "claim 1" insert --,--.

Column 35, Line 15, after "comprising" insert --:--.

Column 35, Line 16, change "table" to --table, in--.

Column 35, Line 22, change "store" to --stored--.

Columns 35-36, Lines 66-67 (Col. 35) and Lines 1-2 (Col. 36), after "and" delete "setting the contents of the determined service in the network connecting device in order to make the network connecting device process the packet based contents of the determined service." and insert the same below "and" as a new line.

Column 36, Line 2, after "based" insert --on the--.

Column 36, Line 44, change "the, session," to --the session,--.

Column 37, Line 5, change "relying" to --relaying--.

Column 37, Line 15, after "key" insert --,--.

UNITED STATES PATENT AND TRADEMARK OFFICE
CERTIFICATE OF CORRECTION

PATENT NO. : 7,433,958 B2
APPLICATION NO. : 11/279338
DATED : October 7, 2008
INVENTOR(S) : Kuniaki Shimada et al.

It is certified that error appears in the above-identified patent and that said Letters Patent is hereby corrected as shown below:

Column 38, Line 4, change "aid" to --said--.

Column 38, Line 9, after "session" insert --table--.

Signed and Sealed this

Thirtieth Day of December, 2008

JON W. DUDAS
*Director of the United States Patent and Trademark Office*